United States Patent
Broberg et al.

(10) Patent No.: US 12,534,751 B1
(45) Date of Patent: Jan. 27, 2026

(54) PRODUCTS FOR PROTEIN ANALYTE DETECTION ASSAYS USING ANTIBODIES

(71) Applicant: OLINK PROTEOMICS AB, Uppsala (SE)

(72) Inventors: John Broberg, Uppsala (SE); Martin Lundberg, Uppsala (SE); Lotta Wik, Uppsala (SE)

(73) Assignee: OLINK PROTEOMICS AB, Uppsala (SE)

( * ) Notice: Subject to any disclaimer, the term of this patent is extended or adjusted under 35 U.S.C. 154(b) by 0 days.

(21) Appl. No.: 19/172,702

(22) Filed: Apr. 8, 2025

Related U.S. Application Data

(63) Continuation of application No. 18/336,450, filed on Jun. 16, 2023, now abandoned, which is a continuation of application No. 17/907,138, filed as application No. PCT/EP2021/058025 on Mar. 26, 2021, now abandoned.

(30) Foreign Application Priority Data

Mar. 27, 2020 (GB) ..................................... 2004469

(51) Int. Cl.
*C12Q 1/6804* (2018.01)
*C12Q 1/6813* (2018.01)

(52) U.S. Cl.
CPC ......... *C12Q 1/6804* (2013.01); *C12Q 1/6813* (2013.01)

(58) Field of Classification Search
CPC .................. C12Q 1/6804; C12Q 2533/107
See application file for complete search history.

(56) References Cited

U.S. PATENT DOCUMENTS

| | | | |
|---|---|---|---|
| 6,511,809 B2 | 1/2003 | Baez et al. | |
| 6,878,515 B1 | 4/2005 | Landegren | |
| 7,306,904 B2 * | 12/2007 | Landegren | G01N 33/542 536/24.31 |
| 7,351,528 B2 | 4/2008 | Landegren | |
| 7,883,848 B2 | 2/2011 | Ericsson | |
| 7,883,849 B1 | 2/2011 | Dahl | |
| 7,914,987 B2 | 3/2011 | Fredriksson et al. | |
| 8,053,188 B2 | 11/2011 | Gullberg et al. | |
| 8,268,554 B2 | 9/2012 | Schallmeiner | |
| 8,293,501 B2 | 10/2012 | Fredriksson et al. | |
| 9,551,032 B2 | 1/2017 | Landegren et al. | |
| 9,677,131 B2 | 6/2017 | Fredriksson et al. | |
| 9,777,315 B2 | 10/2017 | Fredriksson et al. | |
| 10,174,366 B2 | 1/2019 | Landegren et al. | |
| 10,287,631 B2 | 5/2019 | Schmitt et al. | |
| 10,465,235 B2 | 11/2019 | Gullberg et al. | |
| 10,597,701 B2 | 3/2020 | Landegren et al. | |
| 10,612,093 B2 | 4/2020 | Landegren et al. | |
| 10,669,569 B2 | 6/2020 | Gullberg et al. | |
| 10,676,779 B2 | 6/2020 | Chang et al. | |
| 10,731,206 B2 | 8/2020 | Fredriksson et al. | |
| 10,781,473 B2 | 9/2020 | Fredriksson et al. | |
| 10,953,379 B2 | 3/2021 | Smith et al. | |
| 11,034,995 B2 | 6/2021 | Soderberg et al. | |
| 11,072,824 B2 | 7/2021 | Chen et al. | |
| 11,352,658 B2 | 6/2022 | Landegren et al. | |
| 11,656,233 B2 | 5/2023 | Bertozzi et al. | |
| 11,697,840 B2 | 7/2023 | Glezer et al. | |
| 11,718,874 B2 | 8/2023 | Daugharthy et al. | |
| 11,767,550 B2 | 9/2023 | Chee | |
| 11,768,201 B1 | 9/2023 | Mallick | |
| 11,796,535 B2 | 10/2023 | Tsao et al. | |
| 2003/0190646 A1 | 10/2003 | Wenz et al. | |
| 2007/0225487 A1 | 9/2007 | Nilsson et al. | |

(Continued)

FOREIGN PATENT DOCUMENTS

WO 03/044231 A1 5/2003
WO WO-2004094456 A2 * 11/2004 ........... C12Q 1/6851

(Continued)

OTHER PUBLICATIONS

Nong et al., "Solid-phase proximity ligation assays for individual or parallel protein analyses with readout via real-time PCR or sequencing," Nature Protocols, vol. 8, No. 6, pp. 1234-1248. (Year: 2013).*
Darmanis, Spyros et al., ProteinSeq: High-Performance Proteomic Analyses by Proximity Ligation and Next Generation Sequencing, PLoS ONE, vol. 6, Issue 9, pp. 1-10 (Sep. 2011), with Supplemental Material (14 pages).
Nong, Rachel Yuan et al., Solid-phase proximity ligation assays for individual or parallel protein analyses with readout via real-time PCR or sequencing, Nature Protocols, vol. 8, pp. 1234-1248 (2013).
Fredriksson, Simon et al., Multiplexed protein detection by proximity ligation for cancer biomarker validation, Nature Methods, vol. 4, pp. 327-329, and Supplementary Methods pp. 1-10 (2007).

(Continued)

*Primary Examiner* — Young J Kim
(74) *Attorney, Agent, or Firm* — Porter Wright Morris & Arthur LLP

(57) ABSTRACT

Products for detecting a plurality of protein analytes comprise a plurality of proximity probe pairs comprising first and second proximity probes having an antibody or antibody fragment specific for the same protein analyte and a nucleic acid domain, which probes can simultaneously bind to the analyte. Each pair is specific for a different analyte. Each nucleic acid domain comprises an ID sequence and at least a first hybridisation sequence. In each probe pair, ID sequences correspond to a particular analyte, and the probes comprise paired hybridisation sequences. For each probe pair, a splint oligonucleotide comprises hybridisation sequences complementary to each of the paired hybridisation sequences. When probes bind to their protein analyte, the respective paired hybridisation sequences can hybridise to the splint oligonucleotide. At least one pair of hybridisation sequences is shared by at least two pairs of proximity probes. A plurality of sample index oligonucleotides is also included.

40 Claims, 3 Drawing Sheets
Specification includes a Sequence Listing.

(56) References Cited

U.S. PATENT DOCUMENTS

| | | |
|---|---|---|
| 2010/0291636 A1 | 11/2010 | Johansson et al. |
| 2011/0223585 A1 | 9/2011 | Gullberg et al. |
| 2013/0323729 A1 | 12/2013 | Landegren et al. |
| 2013/0338038 A1 | 12/2013 | Dubridge et al. |
| 2015/0275295 A1 | 10/2015 | Wang et al. |
| 2016/0281134 A1 | 9/2016 | Wu |
| 2016/0289750 A1 | 10/2016 | Landegren et al. |
| 2016/0369321 A1 | 12/2016 | Landegren et al. |
| 2019/0203279 A1 | 7/2019 | Landegren et al. |
| 2020/0102592 A1 | 4/2020 | Shannon et al. |
| 2021/0255189 A1 | 8/2021 | Gyllensten et al. |
| 2021/0278398 A1 | 9/2021 | Luo et al. |
| 2021/0285941 A1 | 9/2021 | Luo et al. |
| 2023/0323424 A1* | 10/2023 | Broberg ............... C12Q 1/6804 |

FOREIGN PATENT DOCUMENTS

| | | |
|---|---|---|
| WO | 2006/137932 A2 | 12/2006 |
| WO | 2013/113699 A2 | 8/2013 |
| WO | 2018/108328 A1 | 6/2018 |

OTHER PUBLICATIONS

Cohen, Limor et al., Highly Sensitive and Multiplexed Protein Measurements, Chemical Review, vol. 119, pp. 293-321 (online Aug. 28, 2018).

Lundberg, Martin et al., Multiplexed Homogeneous Proximity Ligation Assays for High-throughput Protein Biomarker Research in Serological Material, Molecular & Cellular Proteomics, vol. 10, Issue 4, pp. 1-10, and Supplementary Materials, pp. 1-27 (Apr. 2011).

Hammond, Maria et al., Profiling Cellular Protein Complexes by Proximity Ligation with Dual Tag Microarray Readout, PLoS ONE, vol. 7, No. 7, pp. 1-9 and Supplementary Material, pp. 1-17 (Jul. 2012).

Assarsson, Erika et al., Homogenous 96-Plex PEA Immunoassay Exhibiting High Sensitivity, Specificity, and Excellent Scalability, vol. 9, Issue 4, e95192, pp. 1-11 (Apr. 2014).

Lundberg, Martin et al., Homogeneous antibody-based proximity extension assays provide sensitive and specific detection of low-abundant proteins in human blood, Nucleic Acids Research, vol. 39, No. 15, e102, pp. 1-8, and Supplementary Materials, pp. 1-37 (published online Jun. 6, 2011).

Söderberg, Ola et al., Direct observation of individual endogenous protein complexes in situ by proximity ligation, Nature Methods, vol. 3, No. 12, pp. 995-1000 (Dec. 2006).

Sanders, Sean et al, Editors, Advancing precision medicine: Current and future proteogenomic strategies for biomarker discovery and development, Science, AAAS, pp. 1-40 (Oct. 2017).

Bentley, David et al, Accurate whole human genome sequencing using reversible terminator chemistry, Nature, vol. 456, pp. 53-59 (Nov. 2008).

Illumina, Data Sheet: Sequencing, Multiplexed Sequencing with the Illumina Genome Analyzer System, pp. 1-3 (2010).

Thorsen, Stine et al, Plasma levels of the MMP-9:TIMP-1 complex as prognostic biomarker in breast cancer: a retrospective study, BMC Cancer, vol. 13, 598, pp. 1-12 (2013).

Copy of European Office Action dated Feb. 19, 2024 from related European Application No. 23182913.6.

Observations dated Jul. 18, 2024 from related European Application No. 21713709.0.

Observations dated Jul. 18, 2024 from related European Application No. 23182913.6.

International Search Report dated Jul. 13, 2021 from related PCT application No. PCT/EP2021/058025.

Observations dated Feb. 19, 2024 from related European Application No. 21713709.0.

European Search Report dated Oct. 5, 2023 from related European Application No. 23182913.6.

European Office Action dated Oct. 8, 2024 from related European Application No. 21713709.0.

European Office Action dated Oct. 8, 2024 from related European Application No. 23182913.6.

Great Britain Search Report dated Dec. 20, 2020 from related Great Britain Application No. GB2004469.9.

Japanese Office Action dated Jun. 13, 2023 from related Japanese Application No. 2022-558355 with English Translation.

First Office Action dated Dec. 31, 2024 from corresponding Chinese Application No. 202180036813.4, with English Translation.

English Translation of Second Office Action dated Jul. 28, 2025 from corresponding Chinese Application No. 2021800368134.

Ebai, Tonge et al., Parallel Protein Detection by Solid-Phase Proximity Ligation Assay wit Real-Time PCR or Sequencing, Current Protocols in Molecular Biology, vol. 20, No. 10, pp. 1-25 (Jan. 2015).

Office Action dated Apr. 10, 2025 from corresponding European Application No. 21719709.0.

Third Party Observation dated Jul. 10, 2025 from corresponding European Application No. 21713709.0.

Office Action dated Sep. 16, 2025 from corresponding European Application No. 217713709.0.

Office Action dated Apr. 10, 2025 from corresponding European Application No. 23182913.6.

Office Action dated Oct. 15, 2025 from corresponding European Application No. 23182913.6.

Office Action dated Apr. 24, 2025 from corresponding Japanese Application No. 2023-144527, with English Translation.

* cited by examiner

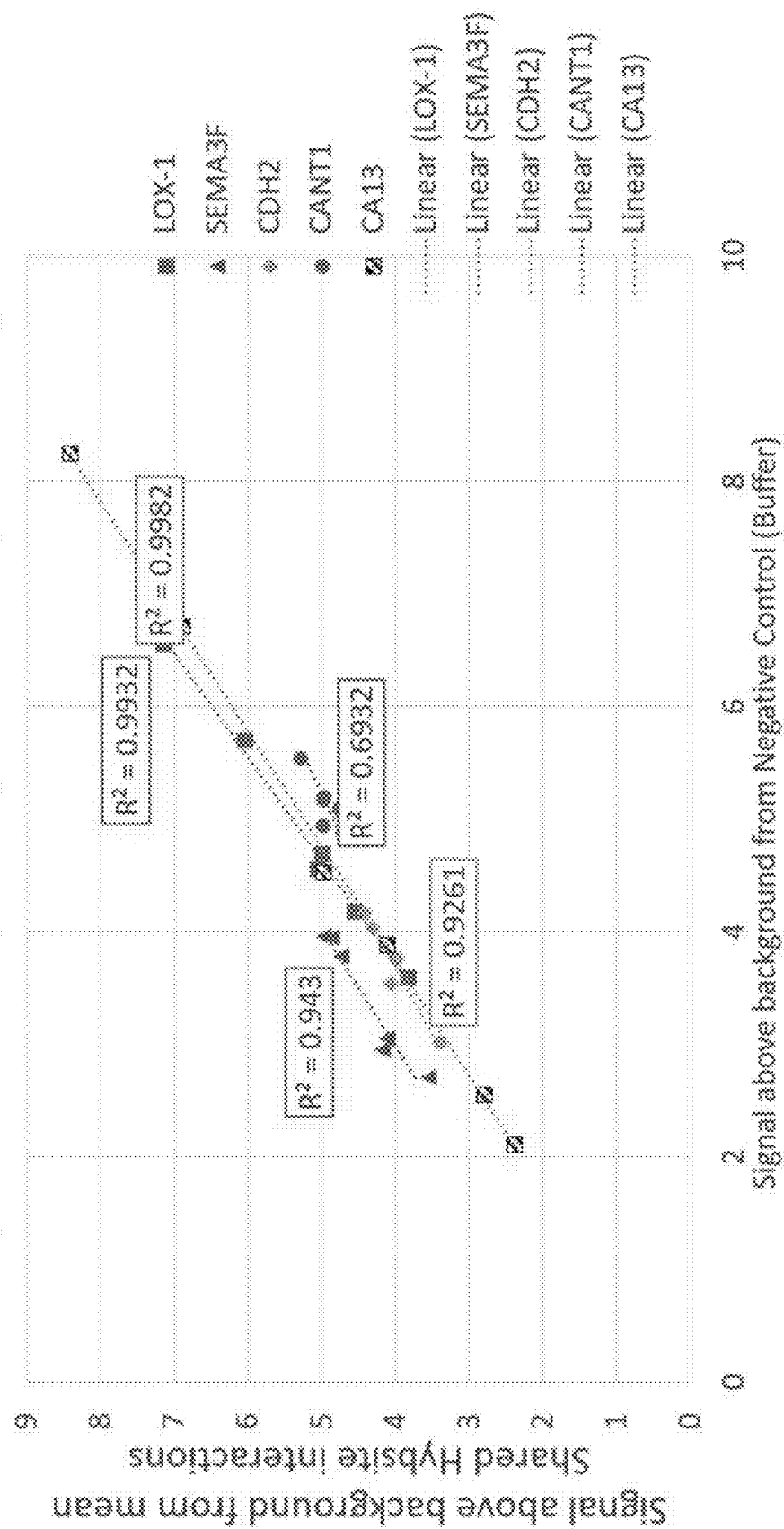

SEQUENCE LISTING

```
Sequence total quantity: 2
SEQ ID NO: 1           moltype = DNA  length = 20
FEATURE                Location/Qualifiers
misc_feature           1..20
                       note = P5 adapter
source                 1..20
                       mol_type = other DNA
                       organism = synthetic construct
SEQUENCE: 1
aatgatacgg cgaccaccga                                                 20

SEQ ID NO: 2           moltype = DNA  length = 24
FEATURE                Location/Qualifiers
misc_feature           1..24
                       note = P7 adapter
source                 1..24
                       mol_type = other DNA
                       organism = synthetic construct
SEQUENCE: 2
caagcagaag acggcatacg agat                                            24
```

PRODUCTS FOR PROTEIN ANALYTE DETECTION ASSAYS USING ANTIBODIES

The Sequence Listing submitted herewith, entitled "April-8-2025-Probe-Product.xml" created Apr. 7, 2025 and having a size of 3142 bytes, is incorporated herein by reference.

FIELD

The present invention provides products for use in protein analyte detection assays and employing antibodies, or fragments thereof, for detecting protein analytes. In specific embodiments, the products are for use in assays for detecting a plurality of protein analytes in a sample, for example, in a multiplex proximity-based detection assay.

BACKGROUND

Modern proteomics methods require the ability to detect a large number of different proteins (or protein complexes) in a small sample volume. To achieve this, multiplex analysis must be performed. Common methods by which multiplex detection of proteins in a sample may be achieved include proximity extension assays (PEA) and proximity ligation assays (PLA). PEA and PLA are described in WO 01/61037; PEA is further described in WO 03/044231, WO 2004/094456, WO 2005/123963, WO 2006/137932 and WO 2013/113699.

PEA and PLA are proximity assays, which rely on the principle of "proximity probing". In these methods an analyte is detected by the binding of multiple (i.e. two or more, generally two or three) probes, which when brought into proximity by binding to the analyte (hence "proximity probes") allow a signal to be generated. Typically, at least one of the proximity probes comprises a nucleic acid domain (or moiety) linked to the analyte-binding domain (or moiety) of the probe, and generation of the signal involves an interaction between the nucleic acid moieties and/or a further functional moiety which is carried by the other probe(s). Thus signal generation is dependent on an interaction between the probes (more particularly between the nucleic acid or other functional moieties/domains carried by them) and hence only occurs when the necessary probes have bound to the analyte, thereby lending improved specificity to the detection system.

In PEA, nucleic acid moieties linked to the analyte-binding domains of a probe pair hybridise to one another when the probes are in close proximity (i.e. when bound to a target), and are then extended using a nucleic acid polymerase. The nucleic acid moieties of the probes within a probe pair comprise complementary "hybridisation sites", which hybridise to one another. The extension product forms a reporter nucleic acid, detection of which demonstrates the presence in a sample of interest of a particular analyte (the analyte bound by the relevant probe pair).

In PLA, nucleic acid moieties linked to the analyte-binding domains of a probe pair come into proximity when the probes of the probe pair bind their target, and may be ligated together, or alternatively they may together template the ligation of separately added oligonucleotides which are able to hybridise to the nucleic acid domains when they are in proximity. In PLA methods at least one "splint" oligonucleotide is provided, which bridges the proximity probe nucleic acid moieties. The splint oligonucleotide comprises sequences which are complementary to "hybridisation sites" on the probe nucleic acid domains. Binding of the probe nucleic acid moieties to the splint oligonucleotide enables the ligation together of the two probe nucleic acid moieties. Alternatively, as mentioned above, a second splint molecule may be added and ligated to the first splint. The ligation product is then amplified, acting as a reporter nucleic acid.

Multiplex analyte detection using PEA or PLA may be achieved by including a unique identifier (ID) sequence, such as a barcode sequence or a primer or probe binding site, in the nucleic acid moiety of each probe. A reporter nucleic acid molecule corresponding to a particular analyte may be identified by the ID sequences it contains.

Some "background" (i.e. false positive) signal is inevitable in proximity assays. Background signal may occur as a result of random interactions with or between unbound proximity probes in the reaction solution. Currently, the level of background signal in a proximity reaction is determined by the use of a separate negative control. For the negative control a proximity assay is performed using just buffer (i.e. no sample), such that all signal is background. Comparison of experimental assays to the negative control allows the true positive signal to be determined.

The present invention provides a method of performing a multiplex proximity assay with an improved background control. In this method, different proximity probe pairs share hybridisation sites. This encourages the formation of "background" signal between all unbound probes sharing the same hybridisation sites. All signal from generated reporter nucleic acids is read together (both true and false positive). True positive signal can be distinguished from false positive signal based on whether the resulting reporter nucleic acid comprises paired barcode sequences (i.e. barcode sequences each corresponding to the same analyte, indicating a true positive signal) or unpaired barcode sequences (i.e. barcode sequences corresponding to different analytes, indicating a false positive signal). The level of false positive signal generated in the reaction indicates the level of background, meaning that a separate negative control reaction to determine background level no longer needs to be performed, simplifying the overall assay.

The use of shared hybridisation sites to determine background also mitigates against differences in the performance between different hybridisation sites. Different pairs of hybridisation sites may interact more or less strongly than others, resulting in different levels of background being produced from each pair of hybridisation sites. The shared hybridisation sites allow the level of background generated from each hybridisation site pair to be individually determined, resulting in a more accurate determination of the level of background to be calculated. The present invention thus provides a more straightforward and accurate means of controlling for false positive results in proximity assays.

SUMMARY OF INVENTION

To this end, in a first aspect the present invention provides a product for detecting a plurality of protein analytes in a sample, comprising:
 (i) a plurality of proximity probe pairs, wherein each proximity probe pair comprises a first proximity probe and a second proximity probe, and each proximity probe comprises:
  (a) an antibody or antibody fragment specific for a protein analyte; and
  (b) a nucleic acid domain,
 wherein both probes within each pair comprise antibodies or antibody fragments specific for the same protein analyte, and can simultaneously bind to the protein analyte; and each probe pair is specific for a different protein analyte;

wherein the nucleic acid domain of each proximity probe comprises an identification (ID) sequence and at least a first hybridisation sequence, wherein the ID sequences of each pair of proximity probes correspond to a particular protein analyte; and wherein in each proximity probe pair, the first proximity probe and the second proximity probe comprise paired hybridisation sequences;

(ii) for each proximity probe pair, a splint oligonucleotide which comprises hybridisation sequences complementary to each of the paired hybridisation sequences of the first proximity probe and the second proximity probe of the pair;

wherein the hybridisation sequences of each proximity probe pair are configured such that when the first proximity probe and the second proximity probe are bound to their protein analyte, the respective paired hybridisation sequences of the first proximity probe and the second proximity probe hybridise to the splint oligonucleotide; and wherein at least one pair of hybridisation sequences is shared by at least two pairs of proximity probes; and (iii) a plurality of sample index oligonucleotides having nucleotide sequences for identifying respective source samples.

In a second aspect, the present invention provides methods for detecting a protein analytes in a sample. The assay method comprises:

(i) contacting the sample with a product of the invention;

(ii) allowing a pair of proximity probes to bind to their protein analyte and allowing the nucleic acid domains of the pair of proximity probes to hybridise to one another or to the splint oligonucleotide, to form a continuous or non-continuous duplex comprising the hybridisation sequence of a first proximity probe and a hybridisation sequence of a second proximity probe, wherein said duplex comprises at least one free 3' end;

(iii) subjecting the duplex to an extension and/or ligation reaction to generate an extension and/or ligation product which comprises the ID sequence of the first proximity probe and the ID sequence of the second proximity probe;

(iv) amplifying the extension product or ligation product;

(v) detecting the extension product or ligation product, wherein detection of the extension product or ligation product comprises identification of the ID sequences therein, and determining the relative amounts of each extension product or ligation product; and (vi) determining which protein analytes are present in the sample.

In another aspect, the present invention provides a method for forming extension or ligation products in a sample. The method comprises:

(i) contacting the sample with a product of the invention;

(ii) allowing a pair of proximity probes to bind to their protein analyte and allowing the nucleic acid domains of the pair of proximity probes to hybridise to one another or to the splint oligonucleotide, to form a continuous or non-continuous duplex comprising the hybridisation sequence of a first proximity probe and a hybridisation sequence of a second proximity probe, wherein said duplex comprises at least one free 3' end; and (iii) subjecting the duplex to an extension and/or ligation reaction to generate an extension and/or ligation product which comprises the ID sequence of the first proximity probe and the ID sequence of the second proximity probe.

In another aspect the present invention provides a product comprising:

(i) a plurality of proximity probe pairs, wherein each proximity probe pair comprises a first proximity probe and a second proximity probe, and each proximity probe comprises:
(a) a protein-binding domain specific for a protein; and
(b) a nucleic acid domain,
wherein both probes within each pair comprise protein-binding domains specific for the same protein, and can simultaneously bind to the protein; and each probe pair is specific for a different protein;

wherein the nucleic acid domain of each proximity probe comprises an ID sequence and at least a first hybridisation sequence, wherein the ID sequence of each proximity probe is different; and wherein in each proximity probe pair, the first proximity probe and the second proximity probe comprise paired hybridisation sequences; and, optionally (ii) a plurality of splint oligonucleotides, each splint oligonucleotide comprising hybridisation sequences complementary to each of the paired hybridisation sequences of a proximity probe pair;

wherein the hybridisation sequences of each proximity probe pair are configured such that upon binding of the first and second proximity probe to their protein, the respective paired hybridisation sequences of the first and second proximity probes hybridise to each other or to a splint oligonucleotide;

and wherein at least one pair of hybridisation sequences is shared by at least two pairs of proximity probes.

DETAILED DESCRIPTION

As detailed above, the invention provides a product and method for detecting a plurality of analytes in a sample. The term "analyte" as used herein means any substance (e.g. molecule) or entity it is desired to detect by the method of the invention. The analyte is thus the "target" of the assay method of the invention, i.e. the substance detected or screened for using the method of the invention.

The analyte may accordingly be any biomolecule or chemical compound it is desired to detect, for example a peptide or protein, or a nucleic acid molecule or a small molecule, including organic and inorganic molecules. The analyte may be a cell or a microorganism, including a virus, or a fragment or product thereof. It will be seen therefore that the analyte can be any substance or entity for which a specific binding partner (e.g. an affinity binding partner) can be developed. All that is required is that the analyte is capable of simultaneously binding at least two binding partners (more particularly, the analyte-binding domains of at least two proximity probes).

Proximity probe-based assays have found particular utility in the detection of proteins or polypeptides. Analytes of particular interest thus include proteinaceous molecules such as peptides, polypeptides, proteins or prions or any molecule which includes a protein or polypeptide component, etc., or fragments thereof. In a particularly preferred embodiment of the invention, the analyte is a wholly or partially proteinaceous molecule, most particularly a protein. That is to say, it is preferred that the analyte is or comprises a protein.

The analyte may be a single molecule or a complex that contains two or more molecular subunits, which may or may not be covalently bound to one another, and which may be the same or different. Thus in addition to cells or microorganisms, such a complex analyte may also be a protein complex, or a biomolecular complex comprising a protein and one or more other types of biomolecule. Such a complex may thus be a homo- or hetero-multimer. Aggregates of molecules, e.g. proteins, may also be target analytes, for example aggregates of the same protein or different proteins. The analyte may also be a complex between proteins or peptides and nucleic acid molecules such as DNA or RNA. Of particular interest may be the interactions between proteins and nucleic acids, e.g. regulatory factors, such as transcription factors, and DNA or RNA. Thus in a particular embodiment the analyte is a protein-nucleic acid complex (e.g. a protein-DNA complex or a protein-RNA complex). In another embodiment, the analyte is a non-nucleic acid analyte, by which is meant an analyte which does not comprise a nucleic acid molecule. Non-nucleic acid analytes include proteins and protein complexes, as mentioned above, small molecules and lipids.

The method of the invention is directed to detecting a plurality of analytes in a sample. The plurality of analytes may be of the same type (e.g. all the analytes may be proteins, or protein complexes), or of different types (e.g. some analytes may be proteins, others protein complexes, others lipids, others protein-DNA or protein-RNA complexes, etc., or any combination of such types of analytes).

The term "a plurality of" as used in the present disclosure means more than one (that is to say, two or more), in line with its standard definition. The terms "a plurality of" and "multiple" are interchangeable. Thus the method of the invention is used to detect at least two analytes in a sample. However, it is preferred that considerably more analytes than two are detected according to the present method. Preferably at least 10, 20, 50, 100, 200, 300, 400, 500, 600, 700, 800, 900, 1000, 1100, 1200, 1300, 1400 or 1500 or more analytes are detected according to the present method.

The term "detecting" or "detected" is used broadly herein to include any means of determining the presence or absence of an analyte (i.e. determining whether a target analyte is present in a sample of interest or not). Accordingly, if a method of the invention is performed and an attempt is made to detect a particular analyte of interest in a sample, but the analyte is not detected because it is not present in the sample, the step of "detecting the analyte" has still been performed, because its presence or absence from the sample has been assessed. The step of "detecting" an analyte is not dependent on that detection proving successful, i.e. on the analyte actually being detected.

Detecting an analyte may further include any form of measurement of the concentration or abundance of the analyte in the sample. Either the absolute concentration of a target analyte may be determined, or a relative concentration of the analyte, for which purpose the concentration of the target analyte may be compared to the concentration of another target analyte (or other target analytes) in the sample or in other samples.

Thus "detecting" may include determining, measuring, assessing or assaying the presence or absence or amount of an analyte in any way. Quantitative and qualitative determinations, measurements or assessments are included, including semi-quantitative determinations. Such determinations, measurements or assessments may be relative, for example when two or more different analytes in a sample are being detected, or absolute. As such, the term "quantifying" when used in the context of quantifying a target analyte in a sample can refer to absolute or to relative quantification. Absolute quantification may be accomplished by inclusion of known concentration(s) of one or more control analytes and/or referencing the detected level of the target analyte with known control analytes (e.g. through generation of a standard curve). Alternatively, relative quantification can be accomplished by comparison of detected levels or amounts between two or more different target analytes to provide a relative quantification of each of the two or more different analytes, i.e. relative to each other. Similarly, the relative levels of a particular analyte in two different samples may be quantified. Methods by which quantification can be achieved in the method of the invention are discussed further below.

The method of the invention is for detecting multiple analytes in a sample. Any sample of interest may be assayed according to the invention. That is to say any sample which contains or may contain analytes of interest, and which a person wishes to analyse to determine whether or not it contains analytes of interest, and/or to determine the concentrations of analytes of interest therein.

Any biological or clinical sample may thus be analysed according to the present invention, e.g. any cell or tissue sample of or from an organism, or any body fluid or preparation derived therefrom, as well as samples such as cell cultures, cell preparations, cell lysates etc. Environmental samples, e.g. soil and water samples, or food samples may also be analysed according to the invention. The samples may be freshly prepared or they may be prior-treated in any convenient way e.g. for storage.

Representative samples thus include any material which may contain a biomolecule, or any other desired or target analyte, including for example foods and allied products, clinical and environmental samples. The sample may be a biological sample, which may contain any viral or cellular material, including prokaryotic or eukaryotic cells, viruses, bacteriophages, mycoplasmas, protoplasts and organelles. Such biological material may thus comprise any type of mammalian and/or non-mammalian animal cell, plant cells, algae including blue-green algae, fungi, bacteria, protozoa etc.

It is preferred that the sample is a clinical sample, for instance whole blood and blood-derived products such as plasma, serum, buffy coat and blood cells, urine, faeces, cerebrospinal fluid or any other body fluid (e.g. respiratory secretions, saliva, milk etc.), tissues and biopsies. It is particularly preferred that the sample is a plasma or serum sample. Thus the method of the invention may be used in the detection of biomarkers, for instance, or to assay a sample for pathogen-derived analytes. The sample may in particular be derived from a human, though the method of the invention may equally be applied to samples derived from non-human animals (i.e. veterinary samples). The sample may be pre-treated in any convenient or desired way to prepare it for use in the method of the invention, for example by cell lysis or removal, etc.

The method of the invention comprises performing a multiplex proximity-based detection assay. As used herein, the term "multiplex" is used to refer to an assay in which multiple (i.e. at least two) different analytes are assayed at the same time in the same reaction mixture. Preferably, however, considerably more than two analytes are assayed in a multiplex reaction according to the invention. For instance, a multiplex reaction may assay at least 5, 10, 15, 20, 25, 30, 40, 50, 60 analytes or more. Certain multiplex reactions may assay more than this number of analytes, e.g. at least 70, 80, 90, 100, 110, 120, 130, 140 or 150 analytes or more.

A "proximity-based detection assay" is any assay which utilises proximity probes to detect an analyte in a sample. Generally speaking a proximity probe is a probe which interacts with at least one other, cognate, proximity probe, to produce a signal which may be detected in order to detect an analyte. Proximity probes are well known in the art. A proximity probe as used according to the present disclosure and invention and as defined in the claims herein is an entity comprising an analyte-binding domain specific for an analyte, and a nucleic acid domain. By "specific for an analyte" is meant that the analyte-binding domain specifically recognises and binds a particular target analyte, i.e. it binds its target analyte with higher affinity than it binds to other analytes or moieties. The analyte-binding domain is preferably an antibody, in particular a monoclonal antibody. Antibody fragments or derivatives of antibodies comprising the antigen-binding domain are also suitable for use as the analyte binding domain. Examples of such antibody fragments or derivatives include Fab, Fab', F(ab')$_2$ and scFv molecules.

A Fab fragment consists of the antigen-binding domain of an antibody. An individual antibody may be seen to contain two Fab fragments, each consisting of a light chain and its conjoined N-terminal section of the heavy chain. Thus a Fab fragment contains an entire light chain and the $V_H$ and $C_H1$ domains of the heavy chain to which it is bound. Fab fragments may be obtained by digesting an antibody with papain.

F(ab')$_2$ fragments consist of the two Fab fragments of an antibody, plus the hinge regions of the heavy domains, including the disulphide bonds linking the two heavy chains together. In other words, a F(ab')$_2$ fragment can be seen as two covalently joined Fab fragments. F(ab')$_2$ fragments may be obtained by digesting an antibody with pepsin. Reduction of F(ab')$_2$ fragments yields two Fab' fragments, which can be seen as Fab fragments containing an additional sulfhydryl group which can be useful for conjugation of the fragment to other molecules. ScFv molecules are synthetic constructs produced by fusing together the variable domains of the light and heavy chains of an antibody. Typically, this fusion is achieved recombinantly, by engineering the antibody gene to produce a fusion protein which comprises both the heavy and light chain variable domains.

The nucleic acid domain of a proximity probe may be a DNA domain or an RNA domain. Preferably it is a DNA domain. The nucleic acid domains of the proximity probes in each pair typically are designed to hybridise to one another, or to one or more common oligonucleotide molecules (to which the nucleic acid domains of both proximity probes of a pair may hybridise). Accordingly, the nucleic acid domains must be at least partially single-stranded. In certain embodiments the nucleic acid domains of the proximity probes are wholly single-stranded. In other embodiments, the nucleic acid domains of the proximity probes are partially single-stranded, comprising both a single-stranded part and a double-stranded part.

Proximity probes are typically provided in pairs, each pair being specific for a target analyte. As noted above, a target analyte may be a single entity, in particular an individual protein. In this embodiment, both probes in the proximity pair bind the target analyte (e.g. protein), but at different epitopes. The epitopes are non-overlapping, so that the binding of one probe in the pair to its epitope does not interfere with or block binding of the other probe in the pair to its epitope. Alternatively, as noted above the target analyte may be a complex, e.g. a protein complex, in which case one probe in the pair binds one member of the complex and the other probe in the pair binds the other member of the complex. The probes bind the proteins within the complex at sites different to the interaction sites of the proteins (i.e. the sites in the proteins through which they interact with each other).

As noted above, proximity probes are provided in pairs, each specific for a target analyte. By this is meant that within each proximity probe pair, both probes comprise analyte-binding domains specific for the same analyte. Since the detection assay used is a multiplex assay, multiple different probe pairs are used in each detection assay, each probe pair being specific for a different analyte. That is to say, the analyte-binding domains of each different probe pair are specific for a different target analyte. Any detection method utilising proximity probes may be used according to the present invention. As detailed above, particularly suitable proximity-based detection assays are proximity extension assays (PEA) and proximity ligation assays (PLA).

The method of the invention comprises a first step of contacting the sample with a plurality of (i.e. multiple) pairs of proximity probes. Each proximity probe pair comprises a first proximity probe and a second proximity probe, and each proximity probe comprises: (a) an analyte-binding domain specific for an analyte; and (b) a nucleic acid domain. In each proximity probe pair, both probes comprise analyte-binding domains specific for the same analyte, and each probe pair is specific for a different analyte (i.e. each probe pair comprises analyte-binding domains which are specific for a different analyte).

The nucleic acid domain of each proximity probe comprises an identification (ID) sequence. Each proximity probe comprises a unique ID sequence (i.e. a different ID sequence is present in each proximity probe). Notably, this does not mean that each individual probe molecule comprises a unique ID sequence. Rather, each probe species comprises a unique ID sequence. By "probe species" is meant a probe comprising a particular analyte-binding domain, and thus in other words, all probe molecules comprising the same analyte-binding domain comprise the same unique ID sequence. Every different probe species comprises a different ID sequence. As further discussed below, the ID sequences allow identification of reporter nucleic acids generated in the method of the invention.

The nucleic acid domain of each proximity probe also comprises at least one (or at least a first) hybridisation sequence. The first hybridisation sequences (which may be the only hybridisation sequences in the proximity probes, depending on the structures of the probes used) are paired within each proximity probe pair. By "paired hybridisation sequences" is meant that the two hybridisation sequences within the pair are capable of directly or indirectly interacting with each other, such that when the method of the invention is performed and a pair of proximity probes bind to their target analyte, the nucleic acid domains of the two probes become directly or indirectly linked to one another.

In a particular and preferred embodiment, paired hybridisation sequences are complementary to one another, such that they hybridise to one another. In this embodiment, the hybridisation sequence of the first proximity probe in a pair is the reverse complement of the hybridisation sequence of the second proximity probe in the pair.

In an alternative embodiment, the paired hybridisation sequences do not hybridise directly to one another, but instead both hybridise to a separate, bridging oligonucleotide, referred to herein as a splint oligonucleotide. The separate oligonucleotide may be regarded as a third oligonucleotide in the assay method. However, one or more splint oligonucleotides may be used, and thus there may be third or further oligonucleotides to which the paired hybridisation sequences may hybridise. In other words, the paired hybridisation sequences are able to hybridise to a common oligonucleotide. This may be a template oligonucleotide which is capable of templating the ligation and/or extension of the nucleic acid domains, or it may be that the extension and/or ligation of the third and optionally further oligonucleotides is templated by the nucleic acid domains.

In one such embodiment, along with the pair of proximity probes the splint oligonucleotide may form a third member of each proximity assay set. The splint oligonucleotide comprises two hybridisation sequences: one complementary to the hybridisation sequence of the first probe in the probe pair, and the other complementary to the hybridisation sequence of the second probe in the probe pair. The splint oligonucleotide is thus capable of hybridising to both of the paired hybridisation sequences of the proximity probes in its proximity assay set. Notably, the splint oligonucleotide is capable of hybridising to both of the paired hybridisation sequences of the proximity probes in its proximity assay set at the same time. Accordingly, when a pair of proximity probes bind their analyte and come into proximity, the nucleic acid domains of the probes both hybridise to the splint oligonucleotide, thus forming a complex comprising the two probe nucleic acid domains and the splint oligonucleotide.

In the present method, at least one pair of hybridisation sequences is shared by at least two pairs of proximity probes. In other words, at least two pairs of proximity probes (which bind to different analytes) have the same hybridisation sequences. Probes from pairs which share a pair of hybridisation sequences are capable of hybridising to each other, or forming a complex together. Hybridisation is most likely to occur between the nucleic acid domains of a pair of proximity probes when they are both bound to their respective analyte, since binding of the probes to the analyte brings the nucleic acid domains into close proximity. However, some interactions will inevitably form between paired hybridisation sequences of the nucleic acid domains of unbound proximity probes in solution (i.e. the nucleic acid domains of proximity probes which are not bound to their analyte), or when only one proximity probe has bound to its target analyte it may interact with another probe in solution. Notably, in solution the nucleic acid domain of an unbound proximity probe is equally likely to hybridise to (or form a complex with) the nucleic acid domain of any proximity probe which has a paired hybridisation sequence, regardless of whether the proximity probe binds the same analyte or a different analyte. Reporter nucleic acids generated as a result of such non-specific hybridisation (i.e. as a result of hybridisation between unbound proximity probes in solution) form background, as described further below.

It is preferred that a significant proportion of probe pairs share their hybridisation sequences with at least one other proximity probe pair. In particular embodiments, at least 25%, 50% or 75% of proximity probe pairs share their hybridisation sequences with another proximity probe pair (i.e. with at least one other proximity probe pair). In a particular embodiment, all proximity probe pairs share their hybridisation sequences with at least one other proximity probe pair. However, as is apparent from the above, in another embodiment at least one pair of hybridisation sequences is unique to a single pair of proximity probes. That is to say, at least one pair of proximity probes does not share its hybridisation sequences with any other proximity probe pair. In particular embodiments, up to 75%, 50% or 25% of pairs of proximity probes do not share their hybridisation sequences with any other proximity probe pair.

In an embodiment of the invention, a single pair of hybridisation sequences is shared across all probe pairs which have shared hybridisation sequences. That is to say, all probe pairs which share their hybridisation sequences with another probe pair have the same pair of hybridisation sequences. In this embodiment, potentially all probe pairs used in the multiplex assay may have the same pair of hybridisation sequences.

However, if too many probe pairs share the same pair of hybridisation sequences, this can allow too large a number of background interactions to take place, hiding the true positive signals. Accordingly, it may be preferred that each pair of hybridisation sequences is shared by a more limited number of probe pairs. In particular embodiments, no more than 20, 15, 10 or 5 proximity probe pairs share the same pair of hybridisation sequences. Thus it is preferred that the multiplex assay of the invention uses multiple sets of proximity probe pairs, each of which share a particular pair of hybridisation sequences. Thus all proximity probe pairs in a particular proximity probe pair set share the same pair of hybridisation sequences, but a different pair of hybridisation sequences is used by each different proximity probe pair set. This enables non-specific hybridisation between all probe pairs within each probe pair set, but prevents non-specific hybridisation between probe pairs in different probe pair sets. In general, each probe pair set comprises in the range 2 to 5 probe pairs, though larger sets may be used if preferred.

The number of probe pair sets used in any given multiplex assay is dependent on the total number of probe pairs used in the assay, i.e. the number of different analytes detected in the assay. Inevitably, the greater the number of probe pairs used in the assay, the greater the number of probe pair sets.

The first step of the method of the invention comprises contacting the sample with the plurality of pairs of proximity probes discussed above. The proximity probes of a pair may be added to the sample pre-mixed as pairs, or as individual proximity probes. That is, the sample may be contacted with the proximity probes of a pair separately or together at the same time, either by contacting the probes simultaneously or in the same reaction mixture. If the proximity probes are configured such that both probes in a probe pair hybridise to a common splint oligonucleotide (rather than to each other), the various splint oligonucleotides may be included with the proximity probe pairs, or with one of the proximity probes of a pair, or may be added separately at the same time, or after the proximity probes. "Contacting the sample" means that the sample and the proximity probe pairs are mixed. The proximity probe pairs may be added to the sample, or conversely the sample may be added to the proximity probe pairs. The sample may be diluted, prior to contacting with the proximity probe pairs. If dilution of the sample is required, this may be performed using an appropriate diluent, for instance a buffer. Suitable buffers for use as diluent include PBS (phosphate-buffered saline), TBS (Tris-buffered saline), HBS (HEPES-buffered saline), etc. The buffer (or other diluent) used must be made up in a purified solvent (e.g. water) such that it does not contain contaminant analytes. The diluent should thus be sterile, and if water is used as diluent or the base of the diluent, the water used is preferably ultrapure (e.g. Milli-Q water).

Following contacting of the sample with the proximity probe pairs, the nucleic acid domains of the proximity probes are allowed to hybridise to one another, or to the splint oligonucleotide, as appropriate. Hybridisation of the nucleic acid domains to one another or to the splint oligonucleotide results in the formation of a continuous or non-continuous duplex. A "duplex" as referred to herein is a section of double-stranded nucleic acid. The duplex comprises the hybridisation sequence of a first proximity probe and the hybridisation sequence of a second proximity probe. If the hybridisation sequences hybridise to a common splint oligonucleotide, rather than to each other, the duplex also comprises the common splint oligonucleotide.

In this step, hybridisation of the nucleic acid domains to one another results in the formation of a continuous duplex, that is to say a single duplex comprising the entirety of the hybridisation sequences of both nucleic acid domains. Hybridisation of the probe nucleic acid domains to a common splint oligonucleotide results in the formation of a discontinuous duplex, comprising a first part formed between the splint oligonucleotide and the hybridisation sequence of the first probe, a second part formed between the splint oligonucleotide and the hybridisation sequence of the second probe, and a gap located between the first and second parts of the duplex (i.e. between the hybridisation sequences of the two probes). The discontinuous duplex may alternatively be seen as two separate duplexes (i.e. the first and second parts of the discontinuous duplex may alternatively be seen as separate first and second duplexes). Seen in this manner, hybridisation of the probe nucleic acid domains to a common splint oligonucleotide results in the formation of two linked duplexes. The duplexes are linked in that they are joined by the common splint oligonucleotide.

The duplex generated by hybridisation of the nucleic acid domains to one another, or to the common splint oligonucleotide, comprises a free 3' end (or at least one free 3' end—the duplex may contain multiple free 3' ends. In certain embodiments the duplex comprises two free 3' ends). A free 3' end is a 3' end of a nucleic acid strand in a duplex which is capable of being extended by a polymerase.

In this step, hybridisation generally and most frequently occurs between the nucleic acid domains of proximity probes in a proximity probe pair, which are bound to a target analyte. However, as described above, background hybridisation also occurs with or between the nucleic acid domains of unbound, unpaired probes in solution. Such background hybridisation occurs between the nucleic acid domains of probes from probe pairs which share common hybridisation sequences.

Following hybridisation of the nucleic acid domains to form the duplex, the duplex is subjected to an extension and/or ligation reaction to generate an extension and/or ligation product which comprises the ID sequence of the first proximity probe and the ID sequence of the second proximity probe. The nature of the reactions performed is dependent on whether the proximity assay performed is a PLA or PEA. In the context of a PEA, only an extension reaction is performed, thus generating an extension product. A number of PEA variants are discussed below. In the context of a PLA, a ligation reaction is performed, but an extension reaction may also be performed. Variants of PLA are also discussed below. Preferably, the extension and/or ligation product is a linear extension and/or ligation product (i.e. it is not a circular product).

Once the extension product or ligation product has been generated, it is amplified. Amplification may be performed using any known nucleic acid amplification technique. Preferably, amplification is performed by PCR, though any other method of nucleic acid amplification may be utilised, e.g. loop-mediated isothermal amplification (LAMP).

In a preferred embodiment, all reporter nucleic acids generated in the multiplex assay (i.e. extension and/or ligation products) comprise common primer binding sites. That is to say, all reporter nucleic acids generated comprise the same pair of primer binding sites. This is advantageous as it allows all reporter nucleic acids generated to be amplified in a single amplification reaction (e.g. PCR) using a single primer pair.

Once amplified, the reporter nucleic acid is detected. Detection of the reporter nucleic acid is achieved by detecting the ID sequences therein. By detecting the ID sequences within the extension or ligation product, it can be determined which probes hybridised to each other to generate the product. The relative amounts of each extension or ligation product are also determined in this step. Any suitable detection method known in the art may be used.

The ID sequence may be any sequence by which a proximity probe may be distinguished or identified. It is thus a tag sequence by which a particular proximity probe may be detected. The ID sequence may be directly detected, or it may provide a binding site for a further entity by which it may be detected, e.g. for a specific primer, or a detection probe.

In a preferred embodiment of the invention, the ID sequences are barcode sequences. A barcode sequence is a particular nucleotide sequence which is defined to correspond to a particular analyte. If each probe carries a barcode sequence, each reporter nucleic acid will contain two barcode sequences: one from each of the two probes which combined to yield the product. When the two barcode sequences are detected, the two probes which combined to yield the reporter nucleic acid can thus be identified. If the two barcode sequences are from a proximity probe pair (i.e. from a pair of probes which bind the same target analyte), the reporter nucleic acid may indicate the presence of the target analyte in the sample, or may be background. If the two barcode sequences are from unpaired proximity probes (i.e. the two barcode sequences are indicative of different analytes), the reporter nucleic acid is deemed background.

The barcode sequences are located within the nucleic acid domains of the probes. The barcode sequence is not located within the first hybridisation sequence: as detailed above, each proximity probe comprises a different barcode sequence, whereas the hybridisation sequences are shared between multiple different probes. Barcode sequences are also not located in the common primer binding sites—as noted above, each probe comprises a unique barcode sequence, whereas it is preferred that all probes comprise common primer binding sites.

Barcode sequences can be detected in a number of ways. Firstly, specific barcode sequences may be detected by sequencing of all the reporter nucleic acid molecules generated during the multiplex detection assay. By sequencing all the reporter nucleic acid molecules generated, all the different reporter nucleic acid molecules generated may be identified by their barcode sequences. Nucleic acid sequencing is the preferred method of reporter nucleic acid detection/analysis.

Other suitable methods for detecting barcodes in the reporter nucleic acid molecules include PCR-based methods. For instance, quantitative PCR utilising "TaqMan" probes may be performed. In this instance, the reporter nucleic acid molecules (or at least a section of each reporter nucleic acid molecule comprising the barcode sequences) is amplified, and a probe complementary to each barcode sequence is provided, with each different probe being conjugated to a different, distinguishable fluorophore. The presence or absence of each barcode can then be determined based on whether the particular barcode is amplified. However, it is apparent that PCR-based methods such as described above are only suitable for analysis of relatively small numbers of different sequences at the same time, although combinatorial methods using probes for decoding barcode sequences are known and may be used to extend multiplexing capacity to a degree. Nucleic acid sequencing does not have any real limit on the number of sequences which can be identified in any one go, enabling higher levels of multiplex reaction than detection using PCR, hence sequencing is the preferred method for reporter nucleic acid molecule detection.

Preferably, a form of high throughput DNA sequencing is used to detect barcodes in the reporter nucleic acid molecules. Sequencing by synthesis is the preferred DNA sequencing method. Examples of sequencing by synthesis techniques include pyrosequencing, reversible dye terminator sequencing and ion torrent sequencing, any of which may be utilised in the present method. Preferably the reporter nucleic acids are sequenced using massively parallel DNA sequencing. Massively parallel DNA sequencing may in particular be applied to sequencing by synthesis (e.g. reversible dye terminator sequencing, pyrosequencing or ion torrent sequencing, as mentioned above). Massively parallel DNA sequencing using the reversible dye terminator method is a preferred sequencing method. Massively parallel DNA sequencing using the reversible dye terminator method may be performed, for instance, using an Illumina® NovaSeq™ system.

As is known in the art, massively parallel DNA sequencing is a technique in which multiple (e.g. thousands or millions or more) DNA strands are sequenced in parallel, i.e. at the same time. Massively parallel DNA sequencing requires target DNA molecules to be immobilised to a solid surface, e.g. to the surface of a flow cell or to a bead. Each immobilised DNA molecule is then individually sequenced. Generally, massively parallel DNA sequencing employing reversible dye terminator sequencing utilises a flow cell as the immobilisation surface, and massively parallel DNA sequencing employing pyrosequencing or ion torrent sequencing utilises a bead as the immobilisation surface.

As is known to the skilled person, immobilisation of DNA molecules to a surface in the context of massively parallel sequencing is generally achieved by the attachment of one or more sequencing adapters to the ends of the molecules, which are capable of attaching the DNA molecules to a target surface. The method of the invention may thus include the addition of one or more adapters for sequencing (sequencing adapters) to the reporter nucleic acid molecules, as described in more detail below.

In alternative embodiment, the ID sequences are not barcode sequences. Rather, the ID sequences may allow identification of the probes by other means. Depending on the nature of the ID sequence, any suitable method may be used to identify the ID sequence. For instance, the ID sequences may be restriction sites (i.e. a nucleotide sequence recognised by a restriction enzyme). In this embodiment, the nucleic acid domain of each proximity probe comprises a different restriction site (such that it is recognised and cleaved by a different restriction enzyme). Different combinations of restriction enzymes may thus be applied to the reporter nucleic acids generated from the multiplex assay, to determine what combinations of probes have interacted. If a reporter nucleic acid is cleaved by both of a pair restriction enzymes applied, this demonstrates that the two probes which comprise the respective restriction sites for the enzymes have interacted to yield a reporter nucleic acid.

In another embodiment, the ID sequences are primer binding sites. In this embodiment, the nucleic acid domain of each proximity probe comprises a unique primer binding site. Amplification of the reporter nucleic acid molecules with different combinations of primers is then performed to determine what combinations of probes have interacted. If an amplification reaction with a particular primer pair yields an amplification product, this demonstrates that the two probes which comprise the respective primer binding sites have interacted to generate a reporter nucleic acid. Any other sequence which serves, in some way, to identify a particular probe may alternatively be used as an ID sequence.

The use of barcode sequences as ID sequences is particularly preferred, since this allows all reporter nucleic acid molecules to be detected in a single sequencing reaction. The use of alternative forms of ID sequence, such as unique restriction or primer binding sites, are less efficient, as they require each combination of restriction enzymes or primers to be tested in a separate reaction to determine which probes have interacted to generate reporter nucleic acids. However, there may nonetheless be occasions on which such an alternative type of ID sequence is preferred.

Thus, the reporter nucleic acid molecules (i.e. the extension or ligation products) are detected, and said detection comprises identification of the ID sequences (preferably barcode sequences) within each reporter nucleic acid, as detailed above. The detection step not only comprises detection of the various reporter nucleic acid molecules generated, but also determining the relative amounts of each reporter nucleic acid molecule. This may be achieved by any suitable means. High throughput DNA sequencing, which as detailed above is a preferred means of reporter nucleic acid detection, is suitable for relative quantification of reporter nucleic acid molecules, since the number of each particular reporter nucleic acid is quantified by the sequencing reaction. As noted above, quantitative PCR is another suitable means by which reporter nucleic acids can be detected. Detection of reporter nucleic acid molecules by quantitative PCR enables the relative amounts of each reporter nucleic acid to be quantified. Any other suitable method for quantifying the relative amounts of each reporter nucleic acid may be used.

Once the reporter nucleic acids have been detected a determination step is performed, to determine which analytes are present in the sample. In this step, firstly the level of background is determined. All reporter nucleic acids generated as a result of non-specific probe interactions may be deemed background interactions. The relative amount of each of these background interactions is determined, such that the level of background interaction is determined. By "non-specific probe interactions" is meant interactions between probes which are not paired, i.e. interactions between probes which bind different analytes. Such reporter nucleic acids are extension products and/or ligation products which comprise a first ID sequence (e.g. barcode sequence) from a first proximity probe belonging to a first proximity probe pair and a second ID sequence (e.g. barcode sequence) from a second proximity probe belonging to a second proximity probe pair. Such reporter nucleic acids may alternatively by described as extension products and/or ligation products which comprise a first ID sequence (e.g. barcode sequence) from a proximity probe specific for a first analyte and a second ID sequence (e.g. barcode sequence) from a proximity probe specific for a second (or different) analyte. As described above, non-specific interactions between unpaired proximity probes may occur between probes free in solution, or when only one probe has bound to its analyte, as a result of their shared hybridisation sites.

Reporter nucleic acids generated by specific probe interactions are then analysed. By "specific probe interactions" is meant interactions between probes within a probe pair, i.e. between two probes which bind to the same analyte. Such reporter nucleic acids are extension products and/or ligation products which comprise a first ID sequence and a second ID sequence (e.g. a first and second barcode sequence) from a proximity probe pair. Such reporter nucleic acids may alternatively by described as extension products and/or ligation products which comprise a first ID sequence and a second ID sequence (e.g. a first and second barcode sequence) from proximity probes specific for the same analyte.

Probes within a probe pair may also interact in solution, and so reporter nucleic acids generated by specific probe interactions may also constitute background (i.e. be generated as a result of background interactions). Therefore the amount of each reporter nucleic acid generated by specific probe interactions is compared to the level of background interaction, as determined by the amount of reporter nucleic acids generated as a result of non-specific probe interactions. If a reporter nucleic acid generated by a specific probe interaction is present at a higher level than the level of background interaction (i.e. the level of non-specific background reporter nucleic acids), this indicates that the analyte bound by the relevant probe pair is present in the sample. On the other hand, if a reporter nucleic acid generated by a specific probe interaction is present at a level which is no higher than the non-specific background reporter nucleic acids (e.g. if the reporter nucleic acid generated by a specific probe interaction is present at a level which is the same or lower than the non-specific background reporter nucleic acids), then the interaction between the relevant probe pair is deemed merely to be background. In this case, the fact that the interaction between the probes of the probe pair is merely background indicates that the analyte bound by the probe pair is not present in the sample.

Alternatively, for any individual target molecule, background interactions may be defined only as non-specific interactions including a probe which binds that target molecule. That is to say, for each target molecule background interactions may be defined as non-specific interactions between a probe which recognises the target molecule and an unpaired probe (i.e. a probe which does not recognise the target molecule) which shares its hybridisation site with the probe pair which recognises the target molecule. Thus in this case non-specific interactions between probes, neither of which recognise the target molecule, are not considered as background interactions for that particular target molecule.

In a particular embodiment, the level of background to which the level of a specific probe interaction is compared is the average level of the background interactions considered, in particular the mean level of the background interactions considered.

In a particular embodiment, the first step of the method (i.e. the step of contacting the sample with a plurality of pairs of proximity probes) further comprises contacting the sample with one or more background probes which do not bind an analyte, said background probes comprising a nucleic acid domain comprising an ID sequence and a hybridisation sequence shared with at least one proximity probe. "Background probes" may also be referred to herein as "inert probes". As noted above the inert probes do not bind an analyte. Inert probes may nonetheless comprise an analyte-binding domain, if it is specific for an analyte which is known not to be present in the sample, in particular an antibody. The inert probe may in effect comprise a "binding domain" which is equivalent to the analyte-binding domain of a functional proximity probe but which does not perform an analyte-binding function, that is the binding domain equivalent is inert. In one embodiment, the inert domain may be provided by bulk IgG. Alternatively, inert probes may comprise an inactive analyte-binding domain, i.e. a non-functional analyte-binding domain. For instance, inert probes may comprise a sham analyte-binding domain, such as the constant region of an antibody, or one chain of an antibody (a heavy chain or a light chain only). Alternatively, inert probes may comprise an inert domain, to which the nucleic acid domain is attached but has no function and is not related to the analyte-binding domains of the active probes. An inert domain may be for example a protein which can be added to the assay without interfering with the assay reactions, such as serum albumin (e.g. human serum albumin or bovine serum albumin). In another alternative, the inert probes are simply nucleic acid molecules, and do not contain a non-nucleic acid domain.

Each inert probe comprises an ID sequence within its nucleic acid domain. The same type of ID sequence is used in the inert probes as in the active (i.e. proximity) probes. For instance, if the active probes use barcode sequences as ID sequences, the inert probes also use barcode sequences as ID sequences. The inert probes each comprise a hybridisation sequence shared with at least one proximity probe. Preferably the inert probes each comprise a hybridisation sequence shared with multiple proximity probes. When inert probes are used, it may be that only a single species of inert probe is used, i.e. all inert probes have the same hybridisation sequence. Preferably however, multiple species of inert probe are used, each inert probe species comprising a different hybridisation sequences (shared with a different proximity probe or different group of proximity probes). It may be that each different species of inert probe has a different, unique, ID sequence. Alternatively, a common inert probe ID sequence may be used by all inert probes, of all different species. Either way, clearly the ID sequence or sequences used in the inert probes are not shared with any proximity probe.

Due to the hybridisation sites shared between the inert probes and certain proximity probes, background interaction in solution between inert probes and proximity probes is possible. When an inert probe interacts with a proximity probe this results in the formation of a duplex between the nucleic acid domains of the two probes. Performance of the extension and/or ligation reaction results in the formation of an extension and/or ligation product from the duplex formed by the two probes. This extension/ligation product is amplified, processed and detected along with all other products of the assay. Extension/ligation products (i.e. reporter nucleic acids) generated from interaction between an inert probe and a proximity probe are deemed background in the determining step.

The multiplex assay used to detect the analytes in the sample is preferably a PEA. In this embodiment, as noted above, the nucleic acid domains of each proximity probe pair comprise complementary hybridisation sequences which hybridise to one another to form the duplex. The duplex formed is subjected to an extension reaction to yield an extension product. In particular, the extension product of a PEA is a linear extension product.

There are several different variants of PEA, each of which uses proximity probes of slightly different design. The nucleic acid domains of each proximity probe are designed dependent on the method in which the probes are to be used. A representative sample of proximity extension assay formats is shown schematically in FIG. 1 and these embodiments are described in detail below. In general, in a proximity extension assay, upon binding of a pair of proximity probes to their target analyte the nucleic acid domains of the two probes come into proximity of each other and interact (i.e. directly or indirectly hybridise to one another). The interaction between the two nucleic acid domains yields a nucleic acid duplex comprising at least one free 3' end (i.e. at least one of the nucleic acid domains within the duplex has a 3' end which can be extended). Addition or activation of a nucleic acid polymerase enzyme within the assay mix leads to extension of the at least one free 3' end. Thus at least one of the nucleic acid domains within the duplex is extended, using its paired nucleic acid domain as template. The extension product obtained comprises ID sequences which indicate from which two probes the extension product was generated.

The nucleic acid domains of proximity probes may be single or partially double-stranded. The nucleic acid domains may hybridise to one another, and one domain may template the extension of the other domain. One or both domains may be extended. Where a nucleic acid domain is partially double-stranded, single-stranded portions of the domains may hybridise to one another. The single-stranded portions may thus be at the 3' end of the strand. Where a nucleic acid domain is partially double-stranded, one strand may be conjugated to the analyte binding domain, and the other strand may be hybridised to the conjugated strand. In particular embodiments, the single-stranded portion of a partially double-stranded domain may be part of the strand which is hybridised to the conjugated strand. As will be described in more detail below, the hybridised strand (as opposed to the conjugated strand) of a partially double-stranded nucleic acid domain may be viewed as a "splint strand" or splint oligonucleotide.

Version 1 of FIG. 1 depicts a "conventional" proximity extension assay, wherein the nucleic acid domain (shown as an arrow) of each proximity probe is attached to the analyte-binding domain (shown as an inverted "Y") by its 5' end, thereby leaving two free 3' ends. When said proximity probes bind to their respective analyte (the analyte is not shown in the figure) the nucleic acid domains of the probes, which are complementary at their 3' ends, are able to interact by hybridisation, i.e. to form a duplex. The addition or activation of a nucleic acid polymerase enzyme in the assay mixture allows each nucleic acid domain to be extended using the nucleic acid domain of the other proximity probe as template, yielding an extension product.

Version 2 of FIG. 1 depicts an alternative proximity extension assay, wherein the nucleic acid domain of the first proximity probe is attached to the analyte-binding domain by its 5' end and the nucleic acid domain of the second proximity probe is attached to the analyte-binding domain by its 3' end. The nucleic acid domain of the second proximity probe therefore has a free 5' end (shown as a blunt arrow), which cannot be extended using a typical nucleic acid polymerase enzyme (which extend only 3' ends). The 3' end of the second proximity probe is effectively "blocked", i.e. it is not "free" and it cannot be extended because it is conjugated to, and therefore blocked by, the analyte-binding domain. In this embodiment, when the proximity probes bind to their respective analyte-binding targets on the analyte, the nucleic acid domains of the probes, which share a region of complementarity at their 3' ends, are able to interact by hybridisation, i.e. form a duplex. However, in contrast to version 1, only the nucleic acid domain of the first proximity probe (which has a free 3' end) may be extended using the nucleic acid domain of the second proximity probe as a template, yielding an extension product.

In version 3 of FIG. 1, like version 2, the nucleic acid domain of the first proximity probe is attached to the analyte-binding domain by its 5' end and the nucleic acid domain of the second proximity probe is attached to the analyte-binding domain by its 3' end. The nucleic acid domain of the second proximity probe therefore has a free 5' end (shown as a blunt arrow), which cannot be extended. However, in this embodiment, the nucleic acid domains which are attached to the analyte binding domains of the respective proximity probes do not have regions of complementarity and therefore are unable to form a duplex directly. Instead, a third nucleic acid molecule is provided that has a region of homology with the nucleic acid domain of each proximity probe. This third nucleic acid molecule acts as a "molecular bridge" or a "splint" between the nucleic acid domains. The splint oligonucleotide bridges the gap between the nucleic acid domains, allowing them to interact with each other indirectly, i.e. each nucleic acid domain forms a duplex with the splint oligonucleotide.

Thus, when the proximity probes bind to their respective analyte-binding targets on the analyte, the nucleic acid domains of the probes each interact by hybridisation, i.e. form a duplex, with the splint oligonucleotide. It can be seen therefore that the third nucleic acid molecule or splint may be regarded as the second strand of a partially double-stranded nucleic acid domain provided on one of the proximity probes. For example, one of the proximity probes may be provided with a partially double-stranded nucleic acid domain, which is attached to the analyte binding domain via the 3' end of one strand and in which the other (non-attached) strand has a free 3' end. Thus such a nucleic acid domain has a terminal single-stranded region with a free 3' end. In this embodiment the nucleic acid domain of the first proximity probe (which has a free 3' end) may be extended using the "splint oligonucleotide" (or single stranded 3' terminal region of the other nucleic acid domain) as a template. Alternatively or additionally, the free 3' end of the splint oligonucleotide (i.e. the unattached strand, or the 3' single-stranded region) may be extended using the nucleic acid domain of the first proximity probe as a template.

As is apparent from the above description, in one embodiment, the splint oligonucleotide may be provided as a separate component of the assay. In other words it may be added separately to the reaction mix (i.e. added separately to the proximity probes to the sample containing the analytes). Notwithstanding this, since it hybridises to a nucleic acid molecule which is part of a proximity probe, and will do so upon contact with such a nucleic acid molecule, it may nonetheless be regarded as a strand of a partially double-stranded nucleic acid domain, albeit that it is added separately. Alternatively, the splint may be pre-hybridised to one of the nucleic acid domains of the proximity probes, i.e. hybridised prior to contacting the proximity probe with the sample. In this embodiment, the splint oligonucleotide can be seen directly as part of the nucleic acid domain of the proximity probe, i.e. wherein the nucleic acid domain is a partially double-stranded nucleic acid molecule, e.g. the proximity probe may be made by linking a double-stranded nucleic acid molecule to an analyte-binding domain (preferably the nucleic acid domain is conjugated to the analyte-binding domain by a single strand) and modifying said nucleic acid molecule to generate a partially double-stranded nucleic acid domain (with a single-stranded overhang capable of hybridising to the nucleic acid domain of the other proximity probe).

Hence, the extension of the nucleic acid domain of the proximity probes as defined herein encompasses also the extension of the "splint" oligonucleotide. Advantageously, when the extension product arises from extension of the splint oligonucleotide, the resultant extended nucleic acid strand is coupled to the proximity probe pair only by the interaction between the two strands of the nucleic acid molecule (by hybridisation between the two nucleic acid strands). Hence, in these embodiments, the extension product may be dissociated from the proximity probe pair using denaturing conditions, e.g. increasing the temperature, decreasing the salt concentration etc.

Whilst the splint oligonucleotide depicted in Version 3 of FIG. 1 is shown as being complementary to the full length of the nucleic acid domain of the second proximity probe, this is merely an example and it is sufficient for the splint to be capable of forming a duplex with the ends (or near the ends) of the nucleic acid domains of the proximity probes, i.e. to form a bridge between the nucleic acid domains of the two probes.

In another embodiment, the splint oligonucleotide may be provided as the nucleic acid domain of a third proximity probe as described in WO 2007/107743, which is incorporated herein by reference, which demonstrates that this can further improve the sensitivity and specificity of proximity probe assays.

Version 4 of FIG. 1 is a modification of Version 1, wherein the nucleic acid domain of the first proximity probe comprises at its 3' end a sequence that is not fully complementary to the nucleic acid domain of the second proximity probe. Thus, when said proximity probes bind to their respective analyte the nucleic acid domains of the probes are able to interact by hybridisation, i.e. to form a duplex, but the extreme 3' end of the nucleic acid domain (the part of the nucleic acid molecule comprising the free 3' hydroxyl group) of the first proximity probe is unable to hybridise to the nucleic acid domain of the second proximity probe and therefore exists as a single stranded, unhybridised, "flap". On the addition or activation of a nucleic acid polymerase enzyme, only the nucleic acid domain of the second proximity probe may be extended using the nucleic acid domain of the first proximity probe as template. Thus in this embodiment, only the 3' end of the nucleic acid domain of the second proximity probe is "free"—the 3' end of the nucleic acid domain of the first proximity probe is not "free", because it is not complementary to the nucleic acid domain of the second proximity probe, and thus is not hybridised to it and cannot be extended.

Version 5 of FIG. 1 could be viewed as a modification of Version 3. However, in contrast to Version 3, the nucleic acid domains of both proximity probes are attached to their respective analyte-binding domains by their 5' ends. In this embodiment the 3' ends of the nucleic acid domains are not complementary and hence the nucleic acid domains of the proximity probes cannot interact or form a duplex directly. Instead, a third nucleic acid molecule is provided that has a region of homology with the nucleic acid domain of each proximity probe. This third nucleic acid molecule acts as a "molecular bridge" or a "splint" between the nucleic acid domains. This "splint" oligonucleotide bridges the gap between the nucleic acid domains, allowing them to interact with each other indirectly, i.e. each nucleic acid domain forms a duplex with the splint oligonucleotide. Thus, when the proximity probes bind to their respective analyte, the nucleic acid domains of the probes each interact by hybridisation, i.e. form a duplex, with the splint oligonucleotide.

In accordance with Version 3, it can be seen therefore that the third nucleic acid molecule or splint may be regarded as the second strand of a partially double stranded nucleic acid domain provided on one of the proximity probes. In a preferred example, one of the proximity probes may be provided with a partially double-stranded nucleic acid domain, which is attached to the analyte binding domain via the 5' end of one strand and in which the other (non-attached) strand has a free 3' end. Thus such a nucleic acid domain has a terminal single stranded region with at least one free 3' end. In this embodiment the nucleic acid domain of the second proximity probe (which has a free 3' end) may be extended using the "splint oligonucleotide" as a template. Alternatively or additionally, the free 3' end of the splint oligonucleotide (i.e. the unattached strand, or the 3' single-stranded region of the first proximity probe) may be extended using the nucleic acid domain of the second proximity probe as a template.

As discussed above in connection with Version 3, the splint oligonucleotide may be provided as a separate component of the assay. On the other hand, since it hybridises to a nucleic acid molecule which is part of a proximity probe, and will do so upon contact with such a nucleic acid molecule, it may be regarded as a strand of a partially double-stranded nucleic acid domain, albeit that it is added separately. Alternatively, the splint may be pre-hybridised to one of the nucleic acid domains of the proximity probes, i.e. hybridised prior to contacting the proximity probe with the sample. In this embodiment, the splint oligonucleotide can be seen directly as part of the nucleic acid domain of the proximity probe, i.e. wherein the nucleic acid domain is a partially double-stranded nucleic acid molecule, e.g. the proximity probe may be made by linking a double-stranded nucleic acid molecule to an analyte-binding domain (preferably the nucleic acid domain is conjugated to the analyte-binding domain by a single strand) and modifying said nucleic acid molecule to generate a partially double-stranded nucleic acid domain (with a single-stranded overhang capable of hybridising to the nucleic acid domain of the other proximity probe).

Hence, the extension of the nucleic acid domain of the proximity probes as defined herein encompasses also the extension of the "splint" oligonucleotide. Advantageously, when the extension product arises from extension of the splint oligonucleotide, the resultant extended nucleic acid strand is coupled to the proximity probe pair only by the interaction between the two strands of the nucleic acid molecule (by hybridisation between the two nucleic acid strands). Hence, in these embodiments, the extension product may be dissociated from the proximity probe pair using denaturing conditions, e.g. increasing the temperature, decreasing the salt concentration etc.

Whilst the splint oligonucleotide depicted in Version 5 of FIG. 1 is shown as being complementary to the full length of the nucleic acid domain of the first proximity probe, this is merely an example and it is sufficient for the splint to be capable of forming a duplex with the ends (or near the ends) of the nucleic acid domains of the proximity probes, i.e. to form a bridge between the nucleic acid domains of the proximity probes.

In another embodiment, the splint oligonucleotide may be provided as the nucleic acid domain of a third proximity probe as described in WO 2007/107743, which is incorporated herein by reference, which demonstrates that this can further improve the sensitivity and specificity of proximity probe assays.

Version 6 of FIG. 1 is the most preferred embodiment of the present invention. As depicted, both probes in a pair are conjugated to partially single-stranded nucleic acid molecules. In each probe, a short nucleic acid strand is conjugated via its 5' end to the analyte-binding domain. The short nucleic acid strands which are conjugated to the analyte-binding domains do not hybridise to each other. Rather, each short nucleic acid strand is hybridised to a longer nucleic acid strand, which has a single-stranded overhang at its 3' end (that is to say, the 3' end of the longer nucleic acid strand extends beyond the 5' end of the shorter strand conjugated to the analyte-binding domain. The overhangs of the two longer nucleic acid strands hybridise to one another, forming a duplex. The longer nucleic acid strands, which hybridise to each other, are referred to herein as "hybridisation oligonucleotides". If the 3' ends of the two longer nucleic acid molecules hybridise fully to one another, as shown, the duplex comprises two free 3' ends, though the 3' ends of the longer nucleic acid molecules may be designed as in Version 4, such that the extreme 3' end of one of the longer nucleic acid molecules is not complementary to the other, and thus forms a flap, meaning that the duplex contains only one free 3' end.

Thus it can be seen that when the method of the invention is performed using a PEA, in some embodiments, in each proximity probe pair at least one nucleic acid domain is partially double-stranded. It may be that in each proximity probe pair one nucleic acid domain is partially double-stranded (as in Versions 3 and 5). It is preferred that in each proximity probe pair both nucleic acid domains are partially double-stranded, as in Version 6.

As detailed in respect of Version 6, it is preferred that the partially double-stranded nucleic acid domain comprises:
 (i) a first oligonucleotide conjugated to the analyte-binding domain; and
 (ii) a hybridisation oligonucleotide comprising the first hybridisation sequence, the ID sequence and a second hybridisation sequence, the first hybridisation sequence being located at the 3' end of the hybridisation oligonucleotide;
 wherein the double-stranded part of the nucleic acid domain comprises a duplex between the second hybridisation sequence of the hybridisation oligonucleotide and the first oligonucleotide, and the single-stranded part of the nucleic acid domain comprises the first hybridisation sequence of the hybridisation oligonucleotide.

In a particular embodiment, the hybridisation oligonucleotide comprises, from 5' to 3', the second hybridisation sequence, the ID sequence (preferably barcode sequence) and the first hybridisation sequence, and the ID sequence (preferably barcode sequence) is located in the single-stranded part of the nucleic acid domain.

It may be the case that all proximity probes comprise the same first oligonucleotide and the same second hybridisation sequence (within the hybridisation oligonucleotide). In other words, all proximity probes may share a universal first oligonucleotide and second hybridisation sequence. This may result in a more straightforward manufacturing process for the probes.

As detailed above, the first oligonucleotide and the second hybridisation sequence are complementary to one another, such that the two sequences are capable of hybridising to each other. In a particular embodiment the second hybridisation site is complementary to the entirety of the first oligonucleotide, such that the duplex formed between them comprises the entire first oligonucleotide. This is not essential though, and it may be that the second hybridisation site is complementary only to part of the first oligonucleotide, such that the formed between them comprises only part of the first oligonucleotide. As also noted above, the first hybridisation sequence is located at the 3' end of the hybridisation oligonucleotide, such that when two probes with complementary first hybridisation sequences come into proximity, the 3' ends of their hybridisation oligonucleotides hybridise to one another. By "located at the 3' end" may mean that the first hybridisation sequence extends to the 3' terminus of each hybridisation oligonucleotide, i.e. the first hybridisation sequences may include the 3' nucleotide of each hybridisation oligonucleotide. However, this is not essential, and the first hybridisation sequence may alternatively extend only to the 3' terminus of one hybridisation oligonucleotide in each probe pair. The nucleic acid domains used in PEA Version 6 above may thus be designed in the same manner as those of Version 4, such that one of the hybridisation oligonucleotides in each probe pair comprises at its 3' end a sequence that is not fully complementary to the hybridisation oligonucleotide of the other proximity probe, and thus forms a single stranded, unhybridised, "flap".

Thus, following hybridisation of two nucleic acid domains to each other, at least one hybridisation oligonucleotide is extended to generate the extension product (in other words, one or both hybridisation oligonucleotides are extended to generate the extension product). If the first hybridisation sequences extend to the 3' termini of both hybridisation oligonucleotides in each probe pair, it may be that both hybridisation oligonucleotides are extended to generate the extension product. On the other hand, if one of the hybridisation oligonucleotides comprises an unhybridised flap at its 3' end (as detailed above), only one of the hybridisation oligonucleotides is extended to generate the extension product (i.e. the hybridisation oligonucleotide without the flap).

When the multiplex assay performed is a PEA, it is preferred that the extension reaction is performed in the context of a PCR amplification, or in other words a single reaction, including a PCR amplification, is performed to achieve both extension of the proximity probe nucleic acid domains, thus generating the reporter nucleic acid molecule, and amplification of the generated reporter nucleic acid molecule. In this embodiment, rather than beginning with a denaturation step (as is normally the case in PCR), the reaction begins with an extension step, during which the reporter nucleic acid molecule is generated. Thereafter, a standard PCR is performed to amplify the reporter nucleic acid molecule, beginning with denaturation of the reporter molecule. As detailed above, the PCR is preferably performed using common primers which bind to common sequences at the ends of the reporter nucleic acid molecule. As detailed below, one or both of the primers may also comprise a sequencing adapter. In other words, the extension and amplification steps of the method of the invention may be performed in a single reaction.

In another embodiment the multiplex assay used to detect the analytes in the sample is a PLA. The PLA used may be a "standard" PLA. By this is meant a PLA using a single splint oligonucleotide to join the nucleic acid domains of two proximity probes. In a standard PLA, the nucleic acid domains of each proximity probe pair comprise paired hybridisation sequences which hybridise to the splint oligonucleotide to form the duplex. The nucleic acid domains of the proximity probe pair are conjugated to their respective probes such that in each pair, one proximity probe has a nucleic acid domain with a free 3' end and the other has a nucleic acid domain with a free 5' end, such that the free ends of the nucleic acid domains of the two probes can be ligated together. The splint oligonucleotide may comprise an extension blocker at its 3' end, such that it cannot be extended. Following duplex formation the nucleic acid domains of the two proximity probes are directly or indirectly ligated to each other to generate a ligation product comprising the ID sequence of the first proximity probe and the ID sequence of the second proximity probe.

When the multiplex assay is a PLA, it is preferred that the nucleic acid domains of the proximity probe pair hybridise to the splint oligonucleotide such that there is a break in the duplex between the two nucleic acid domains, but no gap. In other words, the 3' terminus of one nucleic acid domain may hybridise to the nucleotide of the splint directly adjacent to the nucleotide of the splint to which the 5' terminus of the other nucleic acid domain hybridises. This enables direct ligation of the two nucleic acid domains to each other.

Alternatively, the nucleic acid domains of the proximity probe pair may hybridise to the splint oligonucleotide such that there is a gap between the 3' terminus of one nucleic acid domain and the 5' terminus of the other nucleic acid domain. In this embodiment, the duplex formed between the splint oligonucleotide and two probe nucleic acid domains comprises a length of single-stranded nucleic acid from the splint oligonucleotide, separating the two parts of the duplex. The single-stranded gap may be any number of nucleotides in length. In this embodiment, a gap-filling extension reaction is performed to fill the gap between the ends of the two probe nucleic acid domains (i.e. the probe nucleic acid domain comprising the free 3' end is extended, in order to fill the gap). Following gap-filling, the nucleic acid domains of the two splint oligonucleotides are ligated to each other using a ligase enzyme. Ligation of nucleic acid domains to each other following gap-filling is referred to herein as "indirect ligation" of the nucleic acid domains to each other.

The gap-filling extension reaction is performed using a polymerase enzyme lacking strand displacement activity, such that extension ends when the gap is filled, rather than displacing the hybridised nucleic acid domain downstream of the free 3' end. Non-displacing polymerases include the T4 DNA polymerase. Other such polymerases are known in the art.

Following ligation, the ligation product is amplified as described above (e.g. by PCR) and detected. These PLA embodiments yield a linear ligation (or extension and ligation) product. It is preferred that a ligation product, or an extension and ligation product, generated in the method of the invention is linear.

Alternatively, the PLA used may be rolling circle amplification PLA (PLA-RCA). This PLA format uses two splint oligonucleotides which are ligated to each other to generate a ligation product. PLA-RCA is described in e.g. Söderberg et al., Nature Methods 3 (12): 995-1000 (2006). In this embodiment, the proximity probes comprise nucleic acid domains each comprising two hybridisation sequences. The first hybridisation sequence is complementary to a hybridisation sequence on a first splint oligonucleotide, and the second hybridisation sequence is complementary to a hybridisation sequence on a second splint oligonucleotide. The first hybridisation sequences are paired, as described above, such that the same pair of first hybridisation sequences is shared by a number of proximity probe pairs. These hybridise to a particular first splint oligonucleotide, as detailed above. The second hybridisation sequences may also be paired, but more preferably these are universal sites, shared by all proximity probe nucleic acid domains in the multiplex assay, such that only a single second splint oligonucleotide is required for all proximity probe pairs.

In PLA-RCA, the ID sequences (preferably barcode sequences) of the probe nucleic acid domains are located between the first and second hybridisation sites. Upon binding of the two splint oligonucleotides to the probe nucleic acid domains, a gap-filling extension reaction is performed, as described above. The two splint oligonucleotides are then ligated to each other to form a circular molecule, which is amplified by rolling circle amplification, and detected.

As noted above, it is preferred that the reporter nucleic acid is detected by massively parallel DNA sequencing, and that this generally requires the addition of sequencing adapters to the DNA molecule to be sequenced. As detailed above, sequencing adapters function to immobilise the DNA molecule on a surface.

The method of the invention may thus include the addition of one or more adapters for sequencing (sequencing adapters) to the reporter nucleic acids.

Commonly, the sequencing adapters are nucleic acid molecules (in particular DNA molecules). In this instance, short oligonucleotides complementary to the adapter sequences are conjugated to the immobilisation surface (e.g. the surface of a bead or flow cell) to enable annealing of the target DNA molecules to the surface, via the adapter sequences. Alternatively, any other pair of binding partners may be used to conjugate the target DNA molecule to the immobilisation surface, e.g. biotin and avidin/streptavidin. In this case biotin may be used as the sequencing adapter, and avidin or streptavidin conjugated to the immobilisation surface to bind the biotin sequencing adapter, or vice versa.

Sequencing adapters may thus be short oligonucleotides (preferably DNA), generally 10-30 nucleotides long (e.g. 15-25 or 20-25 nucleotides long). As detailed above, the purpose of a sequencing adapter is to enable annealing of the target DNA molecules to an immobilisation surface, and accordingly the nucleotide sequence of a nucleic acid adaptor is determined by the sequence of its binding partner conjugated to the immobilisation surface. Aside from this, there is no particular constraint on the nucleotide sequence of a nucleic acid sequencing adaptor.

A sequencing adapter may be added to a reporter nucleic acid of the invention during PCR amplification. In the case of a nucleic acid sequencing adapter this can be achieved by including a sequencing adapter nucleotide within in one or both primers. Alternatively, if the sequencing adaptor is a non-nucleic acid sequencing adaptor (e.g. a protein/peptide or small molecule) an adapter may be conjugated to one or both PCR primers. Alternatively, a sequencing adapter may be attached to a reporter nucleic acid molecule by directly ligating or conjugating the sequencing adapter to the reporter nucleic acid molecule. Preferably the one or more sequencing adapters used in the present method are nucleic acid sequencing adapters.

One or more nucleic acid sequencing adapters may thus be added to the reporter nucleic acid in one or more ligation and/or amplification steps. Thus if, for instance, two sequencing adapters are added to the reporter nucleic acid molecule (one at each end), these may be added in a single step (e.g. by PCR amplification using a pair of primers which both contain a sequencing adapter) or in two steps. The two steps may be performed using the same or different methods, e.g. a first sequencing adapter may be added to the reporter nucleic acid molecule by ligation and the second by PCR amplification, or vice versa; or a first amplification reaction may be performed to add a first sequencing adapter to the reporter nucleic acid molecule, followed by a second amplification reaction to add a second sequencing adapter to the reporter nucleic acid molecule.

As noted above, one or more sequencing adapters may be added to the reporter nucleic acid molecule. By this is meant one or two sequencing adapters-since sequencing adapters are added to the ends of a DNA molecule, the maximum number of sequencing adapters which can be added to a single DNA molecule (e.g. reporter nucleic acid) is two. Thus a single sequencing adapter may be added to one end of a reporter nucleic acid molecule, or two sequencing adapters may be added to a reporter nucleic acid molecule, one to each end. In a particular embodiment the Illumina P5 and P7 adapters are used, i.e. the P5 adapter is added to one end of the reporter nucleic acid molecule and the P7 adapter is added to the other end. The sequence of the P5 adapter is set forth in SEQ ID NO: 1 (AAT GAT ACG GOG ACC ACC GA) and the sequence of the P7 adapter is set forth in SEQ ID NO: 2 (CAA GCA GAA GAC GGC ATA CGA GAT).

PCR amplification may thus be combined with addition of one or more sequencing adapters to the reporter nucleic acid molecule. This may be achieved by amplification of the reporter nucleic acid molecule using a primer pair comprising at least one sequencing adapter. In this instance, at least one primer in the primer pair comprises a sequencing adapter upstream of the sequence which binds the reporter nucleic acid molecule. Thus the sequencing adapter is generally located at the 5' end of any primer within which it is contained.

In a particular embodiment, an amplification step is performed using a primer pair comprising one primer which includes a sequencing adapter, such that a single sequencing adapter is added to one end of the reporter nucleic acid molecule.

In another embodiment, an amplification step is performed using a primer pair in which both primers comprise a sequencing adapter, such that a sequencing adapter is added to each end of the reporter nucleic acid molecule in a single amplification step.

In another embodiment, two separate amplification reactions are performed to add a sequencing adaptor to each end of the reporter nucleic acid molecule, wherein each amplification step adds a different sequencing adaptor to a different end of the molecule.

In another embodiment, an initial amplification step is performed using primers which do not comprise sequencing adapters. The amplified reporter nucleic acid molecules are then subjected to one or more further amplification reactions to add sequencing adapters to each end of the molecule, as described above.

It is preferred that the reporter nucleic acid (i.e. extension and/or ligation product) is amplified in two PCR steps. In the first PCR reaction a first sequencing adapter is added to one end of the extension product or ligation product. The product of the first PCR reaction is then amplified in a second PCR reaction, in which a second sequencing adapter is added to the other end of the reporter nucleic acid. In a particular embodiment, the first PCR reaction is performed with a nucleic acid polymerase that also has 3' to 5' exonuclease activity, and the second PCR reaction is performed with a nucleic acid polymerase that lacks 3' to 5' exonuclease activity, as described in WO 2012/104261. Suitable nucleic acid polymerases which have 3' to 5' exonuclease activity include T4 DNA polymerase, T7 DNA polymerase, Phi29 (@29) DNA polymerase, DNA polymerase I, Klenow fragment of DNA polymerase I, *Pyrococcus furiosus* (Pfu) DNA polymerase and *Pyrococcus woesei* (Pwo) DNA polymerase. Suitable nucleic acid polymerases which lack 3' to 5' exonuclease activity include the a subunit of DNA polymerase III, the Klenow exo(-) fragment of DNA polymerase I, Taq polymerase, Pfu (exo⁻) DNA polymerase and Pwo (exo⁻) DNA polymerase.

In another embodiment, the same polymerase may be used for both PCR steps, e.g. Pwo or Pfu polymerase.

The method of the present invention may be used to assay multiple samples simultaneously. In this case, separate multiplex assays are performed as described above for each sample. Once the extension and/or ligation product has been generated, a sample index sequence is added. A sample index is a nucleotide sequence which identifies the source sample from which an extension and/or ligation product is derived. Thus a different nucleotide sequence is used as the sample index sequence for extension/ligation products derived from each different sample. Conversely, all extension and/or ligation products from a particular sample are labelled with the same sample index sequence.

Once all products have been labelled with a sample index, the products of multiple samples may be pooled and analysed together. When the reporter nucleic acids are sequenced, the sample index will indicate which sample each individual reporter nucleic acid molecule is from. Any nucleotide sequence may be used as the sample index. Sample index sequences may be of any length but are preferably relatively short, e.g. 3-12, 4-10 or 4-8 nucleotides.

The sample index sequence may be added to the extension/ligation products by any suitable method, for instance the sample index may be added in an amplification reaction (e.g. by PCR) or in a ligation reaction. Notably, if the reporter nucleic acid molecules are to be analysed by massively parallel DNA sequencing, and require sequencing adapters at both ends, the sample index sequence cannot be added such that it is, ultimately, located at an end of the reporter nucleic acid molecules.

In a preferred embodiment, sample index sequences are added to the extension/ligation products during PCR amplification. As noted above, sequencing adapters may also be added to the extension/ligation products during PCR amplification. In a particular embodiment, a dedicated amplification step may be performed exclusively to add the sample index to the reporter nucleic acid molecule. In another embodiment, the sample index may be added during PCR amplification at the same time as one or more sequencing adapters. For instance, if a single PCR amplification is performed to add sequencing adapters to both ends of the reporter nucleic acid molecules, a sample index may be added at the same time. Alternatively, if sequencing adapters are added to each end of the reporter nucleic acid molecule in two sequential PCR amplifications, a sample index may be added during either PCR amplification. The sample index may be added during the first PCR amplification, in which case it may be added to the reporter nucleic acid at the same end as the sequencing adapter is added (internal to the sequencing adapter) or at the opposite end. Alternatively, the sample index may be added during the second PCR amplification, in which case it must be added to the reporter nucleic acid at the same end the sequencing adapter is added (internal to the sequencing adapter. Alternatively, a ligation step may be performed to add the sample index to the end of each reporter nucleic acid molecule prior to amplification.

Another aspect of the present invention is a product which may be used to perform a method of the invention. In particular, as set out above, the product comprises:
(i) a plurality of proximity probe pairs, wherein each proximity probe pair comprises a first proximity probe and a second proximity probe, and each proximity probe comprises:
   (a) a protein-binding domain specific for a protein; and
   (b) a nucleic acid domain,
wherein both probes within each pair comprise protein-binding domains specific for the same protein, and can simultaneously bind to the protein; and each probe pair is specific for a different protein;
wherein the nucleic acid domain of each proximity probe comprises an ID sequence and at least a first hybridisation sequence, wherein the ID sequence of each proximity probe is different; and wherein in each proximity probe pair, the first proximity probe and the second proximity probe comprise paired hybridisation sequences; and, optionally
(ii) a plurality of splint oligonucleotides, each splint oligonucleotide comprising hybridisation sequences complementary to each of the paired hybridisation sequences of a proximity probe pair;
wherein the hybridisation sequences of each proximity probe pair are configured such that upon binding of the first and second proximity probe to their protein, the respective paired hybridisation sequences of the first and second proximity probes hybridise to each other or to a splint oligonucleotide;
and wherein at least one pair of hybridisation sequences is shared by at least two pairs of proximity probes.

The various features of this aspect are the same as the equivalent features of other aspects (e.g. the proximity probes, ID sequences, splint oligonucleotides, hybridisation sequences, etc.). Notably, in this aspect of the invention, both probes within each probe pair comprise protein-binding domains specific for the same protein. In other words, in each probe pair of the product, both probes bind the same protein. As detailed above, the two probes in each probe pair bind their target protein at different epitopes, such that they do not interfere with each other's binding to the target. The probes of the invention may be designed for use in any style or variant of PEA or PLA as described above.

In an embodiment, the product of the invention further comprises one or more background probes (or inert probes) which do not bind an analyte, as described above.

As in the method of the invention, it is preferred that a significant proportion of probe pairs share their hybridisation sequences with at least one other proximity probe pair. In particular embodiments, at least 25%, 50% or 75% of proximity probe pairs share their hybridisation sequences with another proximity probe pair (i.e. with at least one other proximity probe pair), as in the method. In a particular embodiment, all proximity probe pairs share their hybridisation sequences with at least one other proximity probe pair. However, as is apparent from the above, in another embodiment at least one pair of hybridisation sequences is unique to a single pair of proximity probes. That is to say, at least one pair of proximity probes does not share its hybridisation sequences with any other proximity probe pair. In particular embodiments, up to 75%, 50% or 25% of pairs of proximity probes do not share their hybridisation sequences with any other proximity probe pair. As in the method, in certain embodiments no more than 20, 15, 10 or 5 proximity probe pairs in the product share the same pair of hybridisation sequences.

The product of the invention may be provided as a single composition comprising all proximity probes (and if present, splint oligonucleotides and/or inert probes). Alternatively, all components of the product may be provided in separate containers. For instance, proximity probe pairs, splint oligonucleotides and inert probes may all be provided in separate containers. If desired, each probe pair, or even each individual proximity probe, may be provided in a separate container, as may each different splint oligonucleotide and each different inert probe.

The product may further comprise additional components for use in the method of the invention. For instance, the product may comprise one or more nucleic acid polymerase enzymes for use in the extension and/or amplification steps, and/or a ligase enzyme if a ligation step is required. The product may comprise primers for use in amplification. As detailed above, the primers used in the amplification step(s) may comprise sequence adapters for nucleic acid sequencing and/or sample index sequences. The product may also comprise nucleotides (e.g. dATP, dCTP, dGTP and dTTP) for use in the extension/amplification reactions. The product may comprise a solid base to which the reporter nucleic acids can be immobilised for sequencing, e.g. a flow cell or bead.

The invention may be further understood by reference to the non-limiting examples below, and the figures.

BRIEF DESCRIPTION OF FIGURES

FIG. 3 shows a comparison of results obtained for the level of expression of five analytes across six different samples (same samples as used for FIG. 2), as determined by multiplex PEA, using either a traditional negative control or a shared hybridisation site negative control.

EXAMPLES

Figure 1:
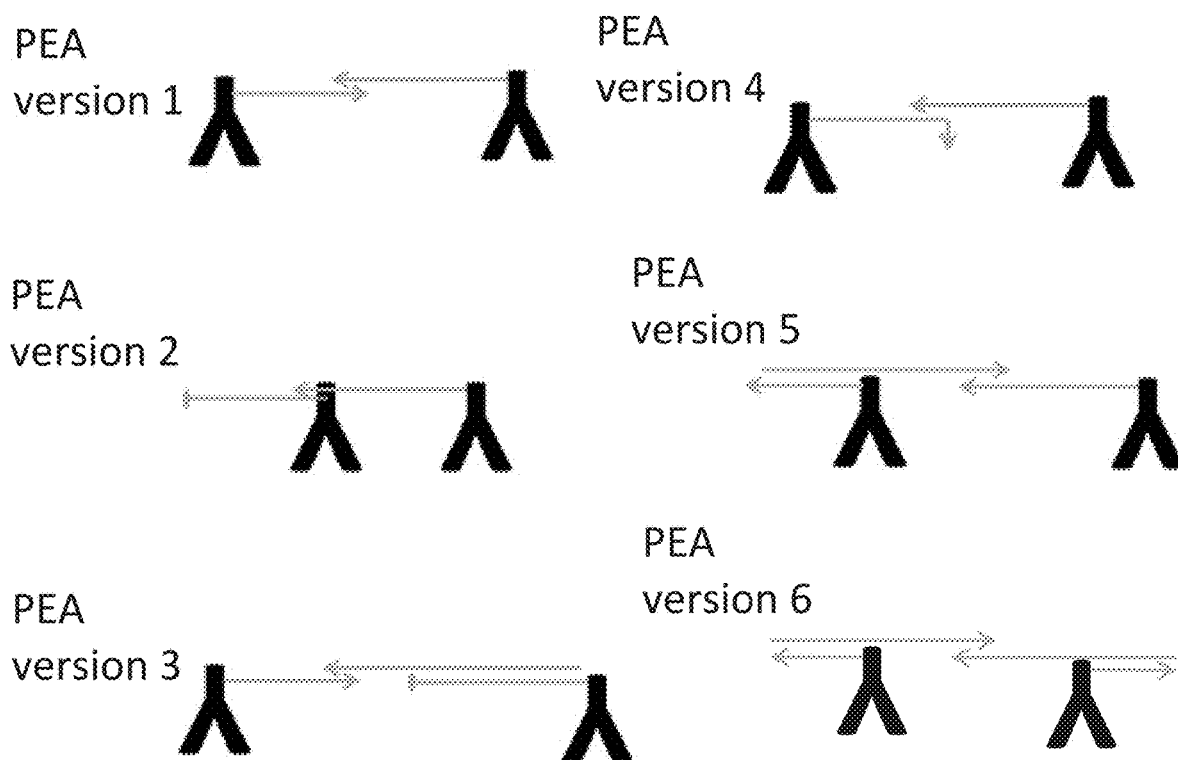
FIG. 1 shows a schematic representation of six different versions of proximity extension assays, described in detail above. The inverted 'Y' shapes represent antibodies, as an exemplary proximity probe analyte-binding domain.

Plasma samples were obtained from 6 donors: 3 healthy subjects, one subject diagnosed with breast cancer, one diagnosed with rheumatoid arthritis (RA) and one diagnosed with inflammatory bowel disease (IBD).

A multiplex PEA was performed (using probes comprising antibodies conjugated to nucleic acid domains having the structure described in Version 6, above) to detect 9 proteins in the samples: NPDC1 (UniProt Q9NQX5); AHCY (UniProt P23526); TM (UniProt P07204); ANGPTL1 (UniProt O95841); LOX-1 (UniProt P78380); SEMA3F (UniProt Q13275); CDH2 (UniProt P19022); CANT1 (UniProt Q8WVQ1); and CA13 (UniProt Q8N1Q1). The probes targeted against NPDC1, AHCY, TM and ANGPTL1 all shared a pair of hybridisation sites; and the probes targeted against LOX-1, SEMA3F, CDH2, CANT1 and CA13 all shared a different pair of hybridisation sites. Each probe contained a unique barcode sequence. A negative control was also used, comprising phosphate buffered saline with 1% bovine serum albumin without sample.

The PEA was performed as described above. During amplification of the extension products, P5 and P7 sequencing adapters were added to each end of the products, along with a unique sample index for reporter nucleic acids from each different sample, and all extension products sequenced by massively parallel DNA sequencing, employing reversible dye terminator sequencing technique using an Illumina NovaSeq platform.

Background from standard negative control for a target was determined from the paired barcode interaction of probes for the target. Background from shared hybridisation sites for a target was determined from the mean value of the mismatched interactions (as determined by mismatched barcodes) between each respective probe of the pair of probes for the target and other probes within the group (i.e. probes that share hybridisation sites with the probes for the target), for each sample. In other words, for each target background from shared hybridisation sites was defined as non-specific interactions between each probe for the target and other probes having shared hybridisation sites. Non-specific interactions between probes, neither of which bind the target, were not included in the calculation of background.

The following results were obtained from the two groups of target analytes:

Group 1—Linear Analysis
Signal Above Background from Negative Control:

|  | NPDC1 | AHCY | TM | ANGPTL1 |
| --- | --- | --- | --- | --- |
| IBD Subject | 4.744595 | 18.77055 | 24.26055 | 5.650493 |
| RA Subject | 24.15997 | 23.02676 | 31.97209 | 16.44529 |
| Breast Cancer Subject | 15.63025 | 5.763718 | 21.46488 | 16.13142 |
| Healthy Control 1 | 10.11761 | 9.273049 | 18.64168 | 24.23299 |
| Healthy Control 2 | 14.58207 | 2.398616 | 26.94637 | 17.11784 |
| Healthy Control 3 | 26.35638 | 6.522163 | 38.96036 | 24.39238 |

Signal Above Background from Shared Hybridisation Sites:

|  | NPDC1 | AHCY | TM | ANGPTL1 |
| --- | --- | --- | --- | --- |
| BD Subject | 6.587558 | 24.20433 | 33.56129 | 6.621035 |
| RA Subject | 30.17537 | 30.42173 | 36.67241 | 14.92188 |
| Breast Cancer Subject | 18.81776 | 6.457732 | 29.32031 | 14.772 |
| Healthy Control 1 | 12.29969 | 10.44351 | 21.19694 | 21.6378 |
| Healthy Control 2 | 14.15044 | 2.597143 | 28.14347 | 13.73367 |
| Healthy Control 3 | 31.26646 | 7.661677 | 46.84286 | 21.24901 |

Group 1—Logarithmic Analysis (Base 2)
Signal Above Background from Negative Control:

|  | NPDC1 | AHCY | TM | ANGPTL1 |
| --- | --- | --- | --- | --- |
| IBD Subject | 2.246285 | 4.230399 | 4.60054 | 2.498377 |
| RA Subject | 4.594547 | 4.52524 | 4.998741 | 4.039603 |
| Breast Cancer Subject | 3.966269 | 2.527 | 4.423906 | 4.011802 |
| Healthy Control 1 | 3.338797 | 3.213044 | 4.22046 | 4.598901 |
| Healthy Control 2 | 3.866123 | 1.262202 | 4.752019 | 4.097428 |
| Healthy Control 3 | 4.72008 | 2.70535 | 5.283935 | 4.608359 |

Signal Above Background from Shared Hybridisation Sites:

|  | NPDC1 | AHCY | TM | ANGPTL1 |
| --- | --- | --- | --- | --- |
| IBD Subject | 2.719744 | 4.597194 | 5.068726 | 2.727057 |
| RA Subject | 4.915299 | 4.92703 | 5.196623 | 3.899357 |
| Breast Cancer Subject | 4.234023 | 2.691028 | 4.873829 | 3.884793 |
| Healthy Control 1 | 3.62055 | 3.384535 | 4.405784 | 4.435482 |
| Healthy Control 2 | 3.822775 | 1.376925 | 4.814728 | 3.779645 |
| Healthy Control 3 | 4.966544 | 2.93766 | 5.549757 | 4.409324 |

Figure 2:
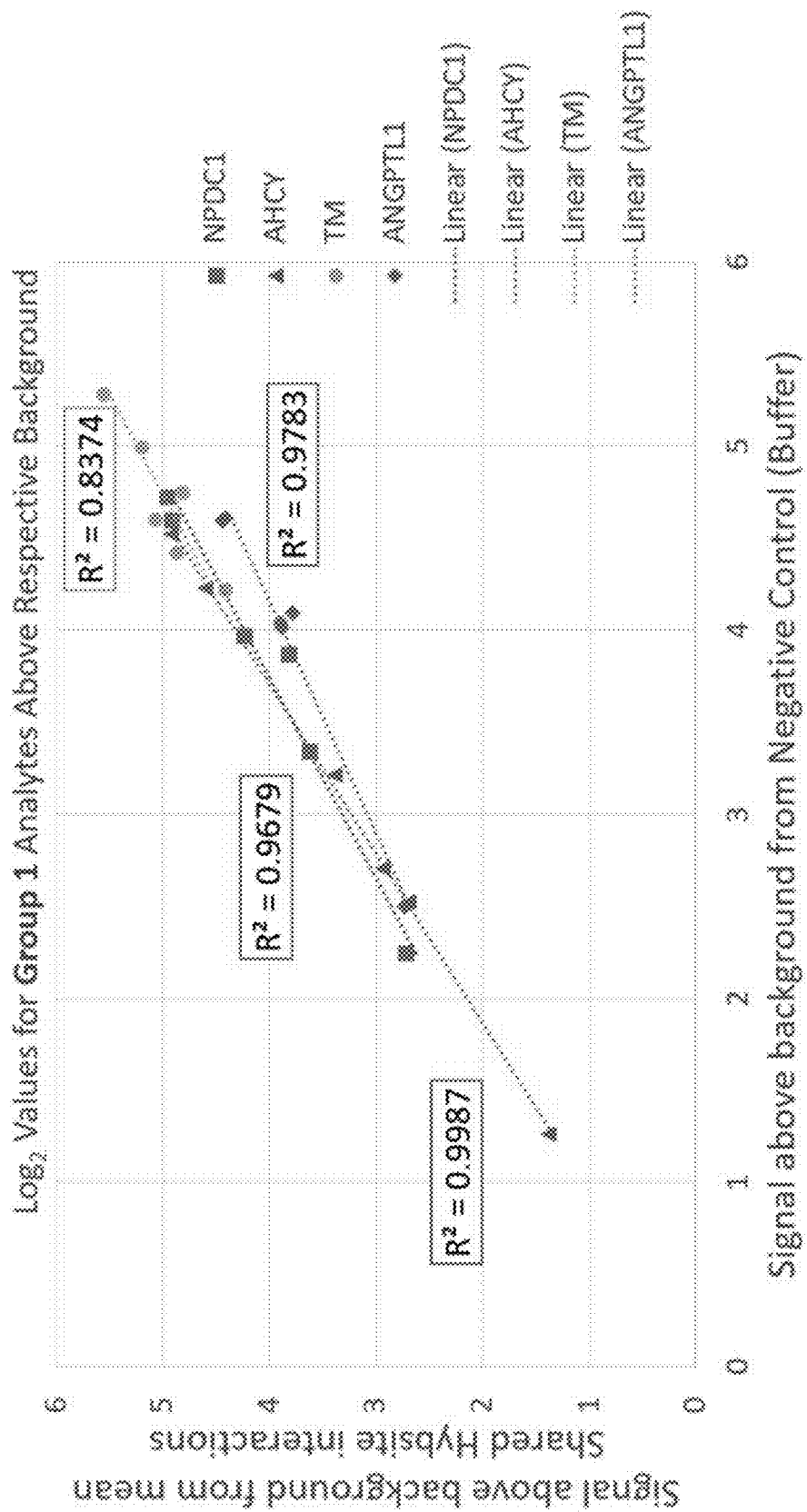
FIG. 2 shows a comparison of results obtained for the level of expression of four analytes across six different samples, as determined by multiplex PEA, using either a traditional negative control or a shared hybridisation site negative control.

The logarithmic results are shown in the graph of FIG. 2.

Group 2—Linear Analysis
Signal Above Background from Negative Control:

|  | LOX-1 | SEMA3F | CDH2 | CANT1 | CA13 |
| --- | --- | --- | --- | --- | --- |
| IBD Subject | 93.75019 | 7.710203 | 11.65482 | 30.88921 | 22.95267 |
| RA Subject | 51.94867 | 15.51322 | 13.56623 | 46.84155 | 304.8523 |
| Breast Cancer Subject | 12.1141 | 15.45434 | 16.45051 | 36.89154 | 104.631 |
| Healthy Control 1 | 23.56257 | 8.300925 | 8.070123 | 29.4027 | 4.299637 |
| Healthy Control 2 | 18.14679 | 6.530255 | 17.95702 | 36.27412 | 14.72176 |
| Healthy Control 3 | 25.83432 | 13.76144 | 13.69109 | 34.4381 | 5.858678 |

Signal Above Background from Shared Hybridisation Sites:

|  | LOX-1 | SEMA3F | CDH2 | CANT1 | CA13 |
| --- | --- | --- | --- | --- | --- |
| IBD Subject | 141.2799 | 18.21138 | 16.84211 | 31.75165 | 31.70223 |
| RA Subject | 65.79012 | 31.66038 | 15.88331 | 39.08923 | 338.9779 |
| Breast Cancer Subject | 14.1692 | 29.58474 | 20.04621 | 31.2304 | 117.9876 |
| Healthy Control 1 | 33.38638 | 17.40281 | 10.59963 | 26.28186 | 5.242938 |
| Healthy Control 2 | 23.59205 | 11.80547 | 21.32377 | 31.38729 | 17.40023 |
| Healthy Control 3 | 32.05737 | 26.6478 | 16.27754 | 27.05954 | 6.934537 |

Group 2—Logarithmic Analysis (Base 2)
Signal Above Background from Negative Control:

|  | LOX-1 | SEMA3F | CDH2 | CANT1 | CA13 |
| --- | --- | --- | --- | --- | --- |
| IBD Subject | 6.55075 | 2.946769 | 3.542855 | 4.949031 | 4.52059 |
| RA Subject | 5.699015 | 3.955426 | 3.761948 | 5.549717 | 8.251967 |
| Breast Cancer Subject | 3.598615 | 3.94994 | 4.04006 | 5.205218 | 6.709166 |
| Healthy Control 1 | 4.558425 | 3.053272 | 3.012591 | 4.877877 | 2.104215 |
| Healthy Control 2 | 4.181643 | 2.707139 | 4.166476 | 5.180869 | 3.879879 |
| Healthy Control 3 | 4.691217 | 3.782559 | 3.775165 | 5.105934 | 2.550575 |

Signal Above Background from Shared Hybridisation Sites:

|  | LOX-1 | SEMA3F | CDH2 | CANT1 | CA13 |
| --- | --- | --- | --- | --- | --- |
| IBD Subject | 7.142412 | 4.186769 | 4.074001 | 4.988759 | 4.986513 |
| RA Subject | 6.039799 | 4.984607 | 3.989439 | 5.288699 | 8.405047 |
| Breast Cancer Subject | 3.824686 | 4.886781 | 4.325258 | 4.964879 | 6.882491 |
| Healthy Control 1 | 5.061188 | 4.121249 | 3.405942 | 4.715995 | 2.390375 |
| Healthy Control 2 | 4.560229 | 3.561384 | 4.41439 | 4.972109 | 4.121035 |
| Healthy Control 3 | 5.002584 | 4.735944 | 4.024811 | 4.758066 | 2.7938 |

The logarithmic results are shown in the graph of FIG. 3. While for both groups of analytes, the actual values of the signals above background may differ between the two types of control (negative control and shared hybridisation sites control), the values shift approximately equally for each analyte for each sample (i.e. there is a parallel shift). This is demonstrated by the high $R^2$ values for the results obtained with each analyte, which indicate a very high correlation between the degree of signal above background as determined by each of the two methods. These results demonstrate that the use of shared hybridisation sites is a valid alternative to a standard negative control since the relative signal levels of an analyte is retained between samples. The results from the background determination from shared hybridisation sites show similar discrimination between samples as when using a standard negative control.

The invention claimed is:

1. A product for detecting a plurality of protein analytes in a sample, comprising:
   (i) a plurality of proximity probe pairs, wherein each proximity probe pair comprises a first proximity probe and a second proximity probe, and each proximity probe comprises:
      (a) an antibody or antibody fragment specific for a protein analyte; and
      (b) a nucleic acid domain,
   wherein both proximity probes within each proximity probe pair comprise antibodies or antibody fragments specific for the same protein analyte, and can simultaneously bind to the protein analyte, wherein all proximity probe pairs specific for the same protein analyte comprise a species of proximity probe pairs, and each species of proximity probe pairs is specific for a different protein analyte;
   wherein the nucleic acid domain of each proximity probe comprises an identification (ID) sequence and at least a first hybridisation sequence, wherein the ID sequences of each species of proximity probe pairs correspond to a particular protein analyte; and
   wherein in each proximity probe pair, the first proximity probe and the second proximity probe comprise paired hybridisation sequences;
   (ii) for each species of proximity probe pairs, a splint oligonucleotide which comprises hybridisation sequences complementary to each of the paired hybridisation sequences of the first proximity probe and the second proximity probe;
   wherein the hybridisation sequences of each proximity probe pair are configured such that when the first proximity probe and the second proximity probe are bound to their protein analyte, the respective paired hybridisation sequences of the first proximity probe and the second proximity probe hybridise to the splint oligonucleotide; and wherein at least one pair of hybridisation sequences is shared by at least two species of proximity probe pairs;
   (iii) a plurality of sample index oligonucleotides having nucleotide sequences for identifying respective source samples; and
   (iv) one or more background probes which do not bind an analyte, said background probes comprising a nucleic acid domain comprising an ID sequence and a hybridisation sequence shared with at least one proximity probe.

2. The product of claim 1, wherein at least one pair of hybridisation sequences is unique to a single species of proximity probe pairs.

3. The product of claim 1, wherein no more than 10 species of proximity probe pairs share the same pair of hybridisation sequences.

4. The product of claim 1, wherein at least 75% of the species of proximity probe pairs share their pair of hybridisation sequences with another species of proximity probe pairs.

5. The product of claim 1, wherein in each proximity probe pair, one or both nucleic acid domains are partially double-stranded.

6. The product of claim 5, wherein in each proximity probe pair, both nucleic acid domains are partially double-stranded.

7. The product of claim 5, wherein the nucleic acid domains of each proximity probe pair comprise paired hybridisation sequences capable of hybridising to the splint oligonucleotide to form a duplex, and wherein the nucleic acid domain of the first proximity probe is capable of directly or indirectly ligating to the nucleic acid domain of the second proximity probe to generate a ligation product comprising the ID sequence of the first proximity probe and the ID sequence of the second proximity probe, when the nucleic acid domains are subjected to a ligation reaction.

8. The product of claim 1, wherein the nucleic acid domains of each of the proximity probe pairs hybridise to the splint oligonucleotide such that there is a gap between the 3' terminus of one nucleic acid domain and the 5' terminus of the other nucleic acid domain.

9. The product of claim 1, wherein the ID sequence of each proximity probe species within a species of proximity probe pairs is different from the ID sequence of the other proximity probe species within the species of proximity probe pairs.

10. The product of claim 1, wherein the ID sequences of the proximity probe species within a species of proximity probe pairs are barcode sequences and are the same as one another.

11. The product of claim 1, comprising species of proximity probe pairs for detecting at least 25 analytes.

12. The product of claim 1, comprising species of proximity probe pairs for detecting at least 50 analytes.

13. The product of claim 1, comprising species of proximity probe pairs for detecting at least 100 analytes.

14. A product for detecting a plurality of protein analytes in a sample, comprising:
   (i) a plurality of proximity probe pairs, wherein each proximity probe pair comprises a first proximity probe and a second proximity probe, and each proximity probe comprises:
      (a) an antibody or antibody fragment specific for a protein analyte; and
      (b) a nucleic acid domain,
   wherein both proximity probes within each proximity probe pair comprise antibodies or antibody fragments specific for the same protein analyte, and can simultaneously bind to the protein analyte, wherein all proximity probe pairs specific for the same protein analyte comprise a species of proximity probe pairs, and each species of proximity probe pairs is specific for a different protein analyte;
   wherein the nucleic acid domain of each proximity probe comprises an identification (ID) sequence and at least a first hybridisation sequence, wherein the ID sequences of each species of proximity probe pairs correspond to a particular protein analyte; and
   wherein in each proximity probe pair, the first proximity probe and the second proximity probe comprise paired hybridisation sequences and one or both nucleic acid domains are partially double-stranded,
   wherein at least one partially double-stranded nucleic acid domain comprises
   a first oligonucleotide conjugated to the analyte-binding domain; and
   a hybridisation oligonucleotide comprising, from 5' to 3', the first hybridisation sequence, the ID sequence and a second hybridisation sequence, and the ID sequence is located in a single-stranded part of the nucleic acid domain;
   (ii) for each species of proximity probe pairs, a splint oligonucleotide which comprises hybridisation sequences complementary to each of the paired hybridisation sequences of the first proximity probe and the second proximity probe;

wherein the hybridisation sequences of each proximity probe pair are configured such that when the first proximity probe and the second proximity probe are bound to their protein analyte, the respective paired hybridisation sequences of the first proximity probe and the second proximity probe hybridise to the splint oligonucleotide; and wherein at least one pair of hybridisation sequences is shared by at least two species of proximity probe pairs; and (iii) a plurality of sample index oligonucleotides having nucleotide sequences for identifying respective source samples.

15. The product of claim 14, further comprising one or more background probes which do not bind an analyte, said background probes comprising a nucleic acid domain comprising an ID sequence and a hybridisation sequence shared with at least one proximity probe.

16. The product of claim 14, wherein at least one pair of hybridisation sequences is unique to a single species of proximity probe pairs.

17. The product of claim 14, wherein no more than 10 species of proximity probe pairs share the same pair of hybridisation sequences.

18. The product of claim 14, wherein at least 75% of the species of proximity probe pairs share their pair of hybridisation sequences with another species of proximity probe pairs.

19. The product of claim 14, wherein in each proximity probe pair, both nucleic acid domains are partially double-stranded.

20. The product of claim 14, wherein the nucleic acid domains of each proximity probe pair comprise paired hybridisation sequences capable of hybridising to the splint oligonucleotide to form a duplex, and wherein the nucleic acid domain of the first proximity probe is capable of directly or indirectly ligating to the nucleic acid domain of the second proximity probe to generate a ligation product comprising the ID sequence of the first proximity probe and the ID sequence of the second proximity probe, when the nucleic acid domains are subjected to a ligation reaction.

21. The product of claim 14, wherein the nucleic acid domains of each of the proximity probe pairs hybridise to the splint oligonucleotide such that there is a gap between the 3' terminus of one nucleic acid domain and the 5' terminus of the other nucleic acid domain.

22. The product of claim 14, wherein the ID sequence of each proximity probe species within a species of proximity probe pairs is different from the ID sequence of the other proximity probe species within the species of proximity probe pairs.

23. The product of claim 14, wherein the ID sequences of the proximity probe species within a species of proximity probe pairs are barcode sequences and are the same as one another.

24. The product of claim 14, comprising species of proximity probe pairs for detecting at least 25 analytes.

25. The product of claim 14, comprising species of proximity probe pairs for detecting at least 50 analytes.

26. The product of claim 14, comprising species of proximity probe pairs for detecting at least 100 analytes.

27. A product for detecting a plurality of protein analytes in a sample, comprising:

(i) a plurality of proximity probe pairs, wherein each proximity probe pair comprises a first proximity probe and a second proximity probe, and each proximity probe comprises:

(a) an antibody or antibody fragment specific for a protein analyte; and (b) a nucleic acid domain, wherein both proximity probes within each proximity probe pair comprise antibodies or antibody fragments specific for the same protein analyte, and can simultaneously bind to the protein analyte, wherein all proximity probe pairs specific for the same protein analyte comprise a species of proximity probe pairs, and each species of proximity probe pairs is specific for a different protein analyte;

wherein the nucleic acid domain of each proximity probe comprises an identification (ID) sequence and at least a first hybridisation sequence, wherein the ID sequences of each species of proximity probe pairs correspond to a particular protein analyte; and wherein in each proximity probe pair, the first proximity probe and the second proximity probe comprise paired hybridisation sequences, one or both nucleic acid domains are partially double-stranded, and the nucleic acid domains of both proximity probes in a pair are conjugated to the protein-binding domain by their 5' ends;

(ii) for each species of proximity probe pairs, a splint oligonucleotide which comprises hybridisation sequences complementary to each of the paired hybridisation sequences of the first proximity probe and the second proximity probe;

wherein the hybridisation sequences of each proximity probe pair are configured such that when the first proximity probe and the second proximity probe are bound to their protein analyte, the respective paired hybridisation sequences of the first proximity probe and the second proximity probe hybridise to the splint oligonucleotide; and wherein at least one pair of hybridisation sequences is shared by at least two species of proximity probe pairs; and (iii) a plurality of sample index oligonucleotides having nucleotide sequences for identifying respective source samples.

28. The product of claim 27, wherein one strand of the partially double-stranded nucleic acid domain has a free 3' end.

29. The product of claim 27, further comprising one or more background probes which do not bind an analyte, said background probes comprising a nucleic acid domain comprising an ID sequence and a hybridisation sequence shared with at least one proximity probe.

30. The product of claim 27, wherein at least one pair of hybridisation sequences is unique to a single species of proximity probe pairs.

31. The product of claim 27, wherein no more than 10 species of proximity probe pairs share the same pair of hybridisation sequences.

32. The product of claim 27, wherein at least 75% of the species of proximity probe pairs share their pair of hybridisation sequences with another species of proximity probe pairs.

33. The product of claim 27, wherein in each proximity probe pair, both nucleic acid domains are partially double-stranded.

34. The product of claim 27, wherein the nucleic acid domains of each proximity probe pair comprise paired hybridisation sequences capable of hybridising to the splint oligonucleotide to form a duplex, and wherein the nucleic acid domain of the first proximity probe is capable of directly or indirectly ligating to the nucleic acid domain of the second proximity probe to generate a ligation product comprising the ID sequence of the first proximity probe and the ID sequence of the second proximity probe, when the nucleic acid domains are subjected to a ligation reaction.

35. The product of claim 27, wherein one strand of the partially double-stranded nucleic acid domain has a free 3' end.

36. The product of claim 27, wherein the ID sequence of each proximity probe species within a species of proximity probe pairs is different from the ID sequence of the other proximity probe species within the species of proximity probe pairs.

37. The product of claim 27, wherein the ID sequences of the proximity probe species within a species of proximity probe pairs are barcode sequences and are the same as one another.

38. The product of claim 27, comprising species of proximity probe pairs for detecting at least 25 analytes.

39. The product of claim 27, comprising species of proximity probe pairs for detecting at least 50 analytes.

40. The product of claim 27, comprising species of proximity probe pairs for detecting at least 100 analytes.

* * * * *